(12) United States Patent
Yamawaki et al.

(10) Patent No.: US 7,846,239 B2
(45) Date of Patent: Dec. 7, 2010

(54) AUTOMATIC FOUR-PORT SELECTOR VALVE

(75) Inventors: Masakatsu Yamawaki, Omura (JP); Toru Murota, Omura (JP); Shinya Kitaguchi, Himeji (JP)

(73) Assignees: Nippon Shokubai Co., Ltd., Osaka-shi (JP); Shinwa Controles Co., Ltd., Kawasaki-shi (JP); Taisei Corporation, Tokyo (JP)

( * ) Notice: Subject to any disclaimer, the term of this patent is extended or adjusted under 35 U.S.C. 154(b) by 251 days.

(21) Appl. No.: 11/912,030

(22) PCT Filed: Apr. 18, 2006

(86) PCT No.: PCT/JP2006/308498

§ 371 (c)(1), (2), (4) Date: Apr. 1, 2008

(87) PCT Pub. No.: WO2006/112534

PCT Pub. Date: Oct. 26, 2006

(65) Prior Publication Data

US 2009/0032129 A1    Feb. 5, 2009

(30) Foreign Application Priority Data

Apr. 19, 2005    (JP)    ............................. 2005-121362

(51) Int. Cl.
*B01D 53/04* (2006.01)

(52) U.S. Cl. ............................... 95/90; 96/113; 96/124; 96/131; 137/625.17

(58) Field of Classification Search ................... 96/113, 96/114, 121, 124, 131; 95/90, 116, 117, 95/148; 137/625, 625.17, 625.46, 625.48
See application file for complete search history.

(56) References Cited

U.S. PATENT DOCUMENTS 2,440,326 A * 4/1948 Cadman ........................ 303/1

(Continued)

FOREIGN PATENT DOCUMENTS

JP    49 118126    10/1974

(Continued)

*Primary Examiner*—Frank M Lawrence
(74) *Attorney, Agent, or Firm*—Oblon, Spivak, McClelland, Maier & Neustadt, L.L.P.

(57) ABSTRACT

An automatic selector valve including a box body having an internal space portion, framed partition plates separating the space portion into four rooms, each framed partition plate having an opening portion, plate-shaped turnable valve bodies opening or closing the opening portions of the framed partition plates, an inflow port letting a gas flow in, an inflow/outflow port letting a gas flow in and flow out alternately, an outflow port letting a gas flow out through, and an inflow/outflow port letting a gas flow in and flow out alternately with the port, the ports provided in the separated four rooms, and a driving mechanism turning the plate-shaped turnable valve bodies about a rotation shaft.

12 Claims, 15 Drawing Sheets

U.S. PATENT DOCUMENTS

| | | | | |
|---|---|---|---|---|
| 2,561,441 | A * | 7/1951 | Wyan | 96/112 |
| 3,193,985 | A * | 7/1965 | Siggelin | 95/125 |
| 3,204,388 | A * | 9/1965 | Asker | 95/119 |
| 3,228,653 | A * | 1/1966 | Trimmer | 251/306 |
| 4,623,001 | A * | 11/1986 | Vogler et al. | 137/625.46 |
| 5,114,441 | A * | 5/1992 | Kanner et al. | 95/98 |
| 5,534,186 | A * | 7/1996 | Walker et al. | 252/194 |
| 6,176,897 | B1 * | 1/2001 | Keefer | 95/98 |
| 6,302,107 | B1 * | 10/2001 | Richey et al. | 128/205.18 |

FOREIGN PATENT DOCUMENTS

| | | |
|---|---|---|
| JP | 55 104623 | 8/1980 |
| JP | 57 27904 | 2/1982 |
| JP | 61 131756 | 6/1986 |
| JP | 62 162544 | 10/1987 |
| JP | 63 63116 | 4/1988 |
| JP | 63 187046 | 8/1988 |
| JP | 4 118024 | 4/1992 |
| JP | 4 227815 | 8/1992 |
| JP | 9 184645 | 7/1997 |
| JP | 9 510389 | 10/1997 |
| JP | 2000 210524 | 8/2000 |
| JP | 2002 504419 | 2/2002 |
| JP | 2003 326127 | 11/2003 |
| JP | 2004 19966 | 1/2004 |
| WO | 03 018189 | 3/2003 |

* cited by examiner

AUTOMATIC FOUR-PORT SELECTOR VALVE

TECHNICAL FIELD

This invention relates to an automatic four-port selector valve that is used for selecting modes (adsorption/regeneration modes) of regeneration operation and adsorption operation in an exhaust gas treatment apparatus, etc. composed of two lines. More specifically, it relates to an automatic four-port selector valve that is used as an attachment to an exhaust gas treatment apparatus, a solvent recovery apparatus, an air cleaning apparatus, a dry air supplying apparatus, etc., having two lines of adsorbent units based on batch type temperature swing adsorption (TSA), and that valve is used for selecting an adsorption/regeneration modes of one adsorbent unit through which a treatment gas such as air, nitrogen gas or the like, is passing to switch the adsorption/regeneration modes from adsorption to regeneration and for selecting an adsorption/regeneration modes of the other adsorbent unit through which regeneration gas is passing to switch the adsorption/regeneration modes from regeneration to adsorption.

BACKGROUND ART

In recent years, as an apparatus for supplying air suitable for an ultra-clean working space, for example, a clean room, a clean chamber, a mini-environment, or the like, which are used in cutting-edge electronics industries such as a semiconductor devices manufacturing plant, a liquid crystal display manufacturing plant, a solar cell manufacturing plant, etc., there have been already practically used a rotor type air cleaning apparatus that can be semi-permanently used by simultaneously performing the adsorption and regeneration of contaminants in air such as an ammonium component, an amine compound component, a sulfur oxide component, an organic compound component, a sodium component, a potassium component, a metal component, water, a peroxide component, etc., with an adsorbent, and said apparatus continuously removes the above molecular contaminants in air and continuously supplies a working space with clean air, and also rotor type dehumidified-air supply apparatus (desiccant) that continuously removes water in air. However, the rotor type air cleaning apparatus essentially has an inherent problem that is difficult to overcome as will be described later, so that it is not easy to bring a further cleaner air environment with a higher degree into reality. In principle, therefore, an air cleaning apparatus and a dehumidified-air supply apparatus provided with two lines of adsorbent units based on a batch type temperature swing adsorption (TSA) are the most preferred. Since, however, this type also has following difficult problems that remain to be solved, and has not yet been put to practical use.

(Conventional Batch Type Temperature Swing Apparatus)

An air cleaning apparatus based on the batch type temperature swing adsorption, as an apparatus for continuously supplying air suitable for a clean working space, generally has first and second adsorbent units (two-line systems). In the first line, cleaning and dehumidification by adsorption are performed, and in the second line, desorption of adsorbed substances and regeneration are performed. Unit portions of the apparatus that perform the above cleaning and dehumidification functions and that perform adsorbed-substances desorption and regeneration functions are required to be as compact as possible. Further, what is even more important is that the apparatus is required to have capability of being substantially free of a variation each in the flow rate, static pressure and pressure difference of supplied gas, each time when "switching of adsorption/regeneration modes" for the adsorption operation and regeneration operation is made in the first line and the second line.

In the conventional batch type temperature swing adsorption apparatus having two lines of adsorbent units, however, it all remains unsolved to provide such a compact apparatus that is also capable of controlling the flow rate variation, static pressure variation and pressure difference variation within tolerant accuracies when switching of the adsorption/regeneration modes are made. These variations at the switching time have been regarded as inevitable so long as a batch type apparatus is used.

(Selection or Switching of Adsorption/Regeneration Modes)

In the batch type temperature swing adsorption (TSA) apparatus having two lines of adsorbent units, the "selection or switching of adsorption/regeneration modes" ("selection of admission modes") refers to the following operation. Specifically, in an operation while a treatment gas (gas to be treated, i.e., a gas such as air containing contaminants and water to be removed by adsorption) is caused to pass through the adsorbent unit in the first line to perform the adsorption operation, concurrently, a regeneration gas (which refers to a gas to be used for the desorption of adsorbed substances, water, etc., and for the regeneration of an adsorbent by heating the adsorbent) is caused to pass through the adsorbent unit in the second line, the adsorbent of the second adsorbent unit is heated for desorption and regeneration until the adsorption capacity of the adsorbent unit in the first line comes to its limit, then, the adsorbent of the second adsorbent unit is cooled and at the time when the regeneration operation is completed, the treatment gas passing through the adsorbent unit in the first line is switched to the regeneration gas, and at the same time the regeneration gas passing through the adsorbent unit in the second line is switched to the treatment gas.

In the switching operation to come thereafter, naturally, switching of adsorption/regeneration modes is made where the regeneration gas is switched to the treatment gas in the first adsorbent line and the treatment gas is switched to the regeneration gas in the second line.

FIG. 6 shows a conventional batch type temperature swing adsorption apparatus having two-line adsorbent units. It will be explained in detail below why the formation or building of a compact unit is difficult in such a conventional apparatus and why a variation in flow rate, a variation in static pressure and a variation in pressure difference are inevitable when the switching of adsorption/regeneration modes are made.

FIG. 6 shows a conventional air cleaning apparatus 200 and based on the batch type temperature swing adsorption provided with two lines of adsorbent units, each unit having honeycomb-shaped of activated carbon as an adsorbent for removing molecular organic contaminants in the air, the shaped activated carbon being stacked in a container.

(Procedures During Steady State Operation)

Treatment air flows in through a treatment air inlet 101, passes through a treatment air duct 106 via a treatment air blower 103, a treatment air filter 102 and a treatment air damper 105 and flows into a branching/confluent point T1 in a first-line duct 110 and a second-line duct 117. When the air is passed through a first-line adsorbent unit 109 to perform adsorption and when regeneration air is passed through a second-line adsorbent unit 118 to perform regeneration, an on-off value V1 on the first line side is in a valve-opened state and an on-off valve V4 on the second line side is in a valve-closed state.

Air to be treated (treatment air) flows in the treatment air duct 106, passes through the branching/confluent point T1, the on-off valve V1 and a branching/confluent point T2 and flows into first-line adsorbent units 109 (109a, 109b) connected to a first-line duct. While the air passes through the first-line adsorbent units 109a and 109b, molecular organic contaminants are eliminated, and the air flows into a supply air duct 115 through an on-off valve V2 in a valve-opened state and a branching/confluent point T4, passes through a supply air filter 128 and flows out of a supply air outlet 116 as cleaned supply air. In this state, the valve V2 is in a valve-opened state, so that on-off valves V3 and V6 are in a valve-closed state.

On the other hand, the regeneration air is sucked into a regeneration air blower 122 from a regeneration air inlet 119 through a regeneration air filter 121 and taken into the air cleaning apparatus 200. The regeneration air flows in a regeneration air duct 120, passes through a regeneration air damper 124, a regeneration air cooler or cooling unit 125 and a heater 127 and flows into a branching/confluent point T8 connected to the first-line duct 110 and the second-line duct 117.

For regenerating second-line adsorbent units 118 (118a, 118b), regeneration air passes though an on-off valve V7 in a valve-opened state, flows in the second-line duct 117 through a branching/confluent point T5 and flows into the second-line adsorbent units 118a and 118b.

During the desorption of substances adsorbed by the second-line adsorbent units 118a and 118b, the regeneration air is heated with the heater 127. For this time period, the cooler 125 is not working or at rest. During the cooling of the second adsorbent units 118a and 118b at a elevated temperature after the desorption of the adsorbed substances, the regeneration air cooler or cooling unit 125 is operated. For this time period, the heater 127 is not working or at rest.

The regeneration air that has passed through the second-line adsorbent units 118a and 118b passes through a branching/confluent point T6 and an on-off valve V8 in a valve-opened state, further passes through a branching/confluent point T7 and flows in an exhaust air duct 113 to be exhausted out of the line through an exhaust air outlet 114. In this case, the on-off valve V8 is in a valve-opened state, and the on-off valves V4 and V5 are hence in a valve-closed state.

Further, the on-off valve V4 is in a valve-closed state, so that no regeneration air flows into the branching/confluent point T1 of the treatment air duct 106.

(Difficulties in Switching of Adsorption/Regeneration Modes)

In the above state, it is required to perform the selection or switching of the adsorption/regeneration modes of the first-line adsorbent units 109a and 109b from adsorption operation to regeneration operation and to switch the second-line adsorbent units 118a and 118b from regeneration operation to adsorption operation within a very short period of time (e.g., 0.8 second), while this switching operation is very difficult.

That is because it is required to switch the four valves (V1, V2, V7 and V8) in a valve-opened state to a valve-closed state in an instant and simultaneously switch the four valves (V3, V4, V5 and V6) in a valve-closed state to a valve-opened state in an instant and simultaneously.

In the conventional air cleaning apparatus 200 provided with the two lines of adsorbent units based on the batch type temperature swing adsorption, if clean air is to be supplied by simultaneously performing adsorption and regeneration, it is required to connect the first-line adsorbent units 109a and 109b, the second-line adsorbent units 118a and 118b and ducts in which the air flows, while preventing the inter-mixing of treatment air, supply air, regeneration air and exhaust air. It is therefore required to provide or arrange, upstream of the adsorbent units, two duct lines where treatment air and exhaust air flow, the branching/confluent point T1 for taking treatment air and distributing the air to the adsorbent units of the first line and the second line, the branching/confluent point T7 of a duct connected to the exhaust air duct 113 that leads exhaust air from the first-line duct 110 and the second-line duct 117 to the exhaust air outlet 114 and the valves V1, V4, V5 and V8 on either side of them for opening and closing duct circuits.

It is also required to provide or arrange, downstream of the adsorbent units, two duct lines where supply air and regeneration air flow, the branching/confluent point T4 connected to the supply air duct 115 that leads supply air to the supply air port 116 from the first-line duct 110 and the second-line duct 117, the branching/confluent point T8 for distributing regeneration air to the adsorbent units of each of the first and second lines, and the valves V2, V3, V6 and V7 on either side of them for opening and closing ducts.

Further, it is also required to provide or arrange the branching/confluent points T2 and T6 for the flow of regeneration air from the first-line duct 110 to the exhaust air duct 113 and from the second-line duct 117 to the exhaust air duct 113, and branching/confluent points T3 and T5 for the flow of regeneration air from the regeneration air duct 120 to the first-line duct 110 and from the regeneration air duct 120 to the second-line duct 117.

As described above, ultimately, it is required to provide or arrange, upstream and downstream of the adsorbent units 109 and 118, two duct lines each or a total of four ducts lines, a total of eight on-off valves and a total of eight branching/confluent points, and it is required to provide or arrange as many as four duct lines.

Therefore, the arrangement of very complicated and long ducts is required. The "duct" for use in a semiconductor manufacturing plant, etc., which the present invention is aimed at or directed to, is not any small pipes having a diameter of approximately 50 mm. The above "duct" refers, for example, to a duct having the cross section of a square each side of which is 500 mm long (for example, when the amount of treatment air is 100 $m^3$/minute, a duct having the cross section of a square has dimensions of approximately 500 mm each for its flow at a rate of approximately 8 m/s).

When the above arrangement extends to a length of 30 m, the ducts alone require an occupation space of as much as 6.2 $m^3$. When the amount of treatment air is 20 $m^3$/minute, and when the flow rate is similarly approximately 8 m/s, the arrangement extending to a length of 30 m requires an occupation space of 1.3 $m^3$ for ducts alone.

That is, the occupation space of ducts where air under atmospheric pressure flows is vast in reality, and in addition thereto, there are occupation spaces necessary for branching/confluent points of ducts, overlaying, crossing, curving and enlarging (reduction) of ducts, on-off valves, attaching of insulating materials, and the like, so that the occupation space of the entire apparatus is extremely large.

The above is a first reason for making it difficult to form a compact batch type temperature swing adsorption apparatus having two lines of adsorbent units. Naturally, it is clear that it is impossible to form any compact apparatus as it is, while the problem cannot be solved with ease.

Further, since the switching of the adsorption/regeneration modes requires simultaneous switching between adsorption and regeneration operations, it is required to simultaneously start the switching operations of a total of the eight on-off valves having a small pressure loss and a large aperture and simultaneously stop their operations without discontinuing the flows of treatment air and supply air, and the selection time period is required to be as small as possible (e.g., 1 second or smaller).

However, it is very difficult to switch all of the eight on-off valves simultaneously for a short period of time. And, if any one or ones of the on-off valves delays or delay slightly, there is further caused a serious problem of variation in the flow rate and pressure of the supply air.

In FIG. 6, for example, when the time for the on-off value V1 to start the switching from being opened to being closed and the time for the on-off valve V4 to start the switching from being closed to being opened delay by 0.1 second, and when the other on-off valves V5, V8, V2, V3, V6 and V7 have no delay, the flow of treatment air stops for a moment (for 0.1 second) and immediately restores itself, and a variation thereby caused in the flow rate is transmitted as such in the supply air duct 115 at a speed corresponding to the flow rate.

On the other hand, concerning a variation in pressure, a sharp variation in pressure takes place in which the pressure changes from a normal supply air static pressure to zero and restores the normal supply air static pressure after 0.1 second.

The above sharp variation in pressure is in fact transmitted in the duct at a very high speed that one skilled in the art does not expect. That is, this variation in pressure is transmitted in the supply air duct 115 at the speed of sound, that is, at a high speed of approximately 320 m/second. In reality, the eight on-off valves have different in a time period for the opening/closing operation, so that various states of variations take place in the above flow rate and pressure.

In the producing step of semiconductors, etc., it is required to supply a large amount of clean air suitable for a clean working space stably and continuously. When such variation of flow rate and pressure of supply air occurs in or during the above switching procedure, it can be a great factor which causes greatly decreasing the through-put or yield of semiconductor products. There exists thus the following serious problem; how variations in the flow rate and pressure taking various varying states caused by the switching operation, in particular the pressure variation that is transmitted at an unexpected high speed or the speed of sound, can be controlled within tolerant accuracies.

Still, another problem with the conventional apparatus of FIG. 6 is that since the air in any ducts between the eight on-off valves and between the eight branching/confluent points comes to stop flowing when the on-off valves are brought into a valve-closed state, thereby creating stagnation portions where the air stays and stagnates as it is until the valves are again brought into a valve-opened state.

For example, the duct between the branching/confluent point T6 and the branching/confluent point T1 and the duct between the branching/confluent point T2 and the branching/confluent point T1 can become stagnation portions where exhaust air, containing a high concentration of desorbed contaminants immediately after the start of regeneration, stagnates, which stagnation causes a serious problem of influencing the cleanness of supply air immediately after the start of adsorption.

As described above, the conventional batch type adsorption apparatus has a plurality of serious problems that cannot be easily solved, so that at present there is attempted another approach to the employment of continuous operation on the basis of completely different operation principles, thereby precluding the necessity of adsorption/regeneration switching modes inherent to the batch type apparatus. For example, JP2001-141274A proposes a rotor type air cleaning apparatus, and JP11-188224A proposes a rotor type dehumidified-air supply apparatus. However, these proposed apparatuses also have the following serious problems.

That is, these rotor type air cleaning apparatuses generally require, depending upon the number of adsorption rotors used, four to six air blowers since two or three rotors are used connected in series. At both upstream and downstream of the rotors, specialized hoods or covers are required in each of three sections or parts of each rotor, the adsorption process, regeneration process and cooling process. In addition to these, a filter, a damper, a valve, a heater and a cooling unit are required. Thus, the rotor type air cleaning apparatus and the rotor type dehumidified-air supply apparatus require a very large number of component units and parts.

Further, the rotor has a larger cross-sectional area than a duct connected thereto. In addition thereto, there are ducts per se, branching/confluent points of ducts, overlaying, crossing, curving or bending arranging and enlarging (reduction) of ducts and hoods for rotors, so that the rotor type air cleaning apparatus and the rotor type dehumidified-air supply apparatus inevitably have a large occupation space. In principle, with the rotor type air clearing apparatus it is difficult to further decrease the occupation space, thereby making application of them to the mini-environment system quite difficult.

Moreover, since the adsorption rotor in the rotor type apparatus rotates, the hoods in those regions, attached upstream and downstream thereof, are required to be attached close to or in vicinity of the end surface or edge face of the rotor. It is hence difficult to prevent the leakage out, leakage in and mixing of air that goes into or comes out of each rotor, such as treatment air, supply air, regeneration air, cooling air or air under treatment. In particular, it is much more difficult to remove molecular contaminants thoroughly until the concentration thereof is extremely low as is required in the semiconductor industry. There is an additional problem that since air is liable to leak from the vicinities of the rotor, thereby making contamination liable to be diffused. Furthermore, it is very difficult to realize a rotor type nitrogen-gas cleaning apparatus or rotor type humidified-nitrogen-gas supply apparatus using nitrogen gas instead of air.

DISCLOSURE OF THE INVENTION

This invention has been made for overcoming the above very difficult problems of prior art.

It is an object of this invention to provide an automatic four-port selector valve, which permits the control of a variation in static pressure and a variation in flow rate, induced when the switching is made of a gas flow passage, within tolerant accuracies, which also permits the control of variation in pressure difference that become significant in a clean temperature-controlled/humidity-controlled-air supply apparatus and a dry air supply apparatus within tolerant accuracies and further which is at the same time improved in airtightness and heat-insulating performance.

It is another object of this invention to provide an air cleaning apparatus, a dry air supply apparatus and a clean temperature-controlled/humidity-controlled air supply apparatus, in which such automatic four-port selector valves are used as a first valve and a second valve in a batch type temperature swing adsorption (TSA) apparatus, having first and second lines of adsorption units to greatly reduce the duct arrangement of the batch type temperature swing adsorption (TSA) apparatus and remove the eight on-off valves attached for the selection of the adsorption/regeneration modes, and further it is also another object of this invention to provide a cleaned-nitrogen gas supply apparatus, a clean temperature-controlled/humidity-controlled gas supply apparatus and a dry nitrogen gas supply apparatus which have conventionally not been realized.

A. According to this invention, the following automatic four-port selector valves are provided.

[1] An automatic four-port selector valve comprising a casing having a space portion inside it, framed partition plates for separating said space portion into four small rooms R1, R2, R3 and R4, the framed partition plates having an opening portion each, plate-shaped turnable valve bodies for opening or closing the opening portions of said framed partition plates, an inflow port L1 for always letting a gas flow in through it in any instance, an inflow/outflow port (1) L2 for letting a gas flow in and flow out through it alternately, an outflow port L3 for always letting a gas flow out through it in any instance and an inflow/outflow port (2) L4 for letting a gas flow in and flow out through it alternately with said L2, these ports being provided in said separated four small rooms, and a driving means for turning said plate-shaped turnable valve bodies about a rotation shaft.

[2] An automatic four-port selector valve of [1], wherein said small rooms R1, R2, R3 and R4 are arranged clockwise around the rotation shaft as said R1 as a start point in the order of the small room R1 provided with said inflow port L1, the small room R2 provided with said inflow/outflow port (1) L2, the small room R3 provided with said outflow port L3 and the small room R4 provided with said inflow/outflow port (2) L4, said R1 and said R3 are arranged in opposite positions constituted to ensure that a gas that flows in through said L1 is caused to flow out into L3 when gas flow passages are switched, and said plate-shaped turnable valve bodies are attached to said rotation shaft in a way to ensure that they are arranged or positioned in said small rooms R2 and said R4 or arranged or positioned in said small rooms R1 and said R3.

[3] An automatic four-port selector valve of [1] or [2], wherein said opening portions each have the form of a square, a rectangle, a circle or an oval each, framed valve seats are formed in inner-edge circumferential portions of said opening portions and said opening portions each have an area corresponding to 20 to 120% of the cross-sectional area of said inflow port L1.

[4] An automatic four-port selector valve of any one of [1] to [3], wherein said plate-shaped turnable valve bodies have a form similar to the form of said opening portions and have plate surfaces which have an area selected from the range of an area that is greater than an area for closing said opening portions to an area smaller than an area that is 1.3 times the area for the closing.

[5] An automatic four-port selector valve of any one of [1] to [4], wherein said casing body is constituted of a side plate, a top plate and a bottom plate, and said side plate, said top plate, said bottom plate, said framed partition plates, said rotation shaft and said plate-shaped turnable valve bodies have heat-insulating functions.

[6] An automatic four-port selector valve of any one of [1] to [5], wherein said plate-shaped turnable valve bodies in a turning operation have an operation time period selected from the range of 0.1 to 20 seconds, and the turning operation is a reciprocating motion whose turning angle is selected from the range of 60° to 122°.

[7] An automatic four-port selector valve of any one of [1] to [6], wherein said opening portions have means capable of independently changing opening ratios (%) thereof, and the means are opening ratio changing means that are movable vertically or horizontally along an inner wall surface of said R1 and/or R3 when said plate-shaped turnable valve bodies are arranged or positioned in said R2 and R4 or along an inner wall surface of said R2 and/or R4 when said plate-shaped turnable valve bodies are arranged or positioned in said R1 and R3, and said means are thereby capable of changing the opening ratios (%) of said opening portions.

[8] An automatic four-port selector valve of any one of [1] to [7], wherein said means for changing opening ratios are constituted of movable plates and their actuators and said movable plates synchronize with turning of said plate-shaped turnable valve bodies in operation.

[9] An automatic four-port selector valve of any one of [1] to [8], wherein said inflow port L1 and/or said outflow port L3 have/has a pressure sensor.

B. According to this invention, further, the following batch type temperature swing adsorption apparatuses are provided.

[10] A batch type temperature swing adsorption apparatus having two lines of adsorbent units, wherein the two lines of adsorbent units have, two said automatic four-port selector valves recited in any one of claims 1 to 9, as a first valve and a second valve in combination, and each of the two lines of adsorbent units is constituted at least of regeneration means for regenerating the adsorption capability of said adsorbent unit, measuring/adjusting means each for a static pressure of treatment gas, a static pressure of supply gas, a static pressure of regeneration gas and a static pressure of exhaust gas, measuring/adjusting means for a flow rate of the regeneration gas and/or a flow rate of the treatment gas and a switching controller for controlling the switching of adsorption operation and regeneration operation (switching of adsorption/regeneration modes) with said first valve and said second valve.

[11] A batch type temperature swing adsorption apparatus of [10], wherein each of said adsorbent units comprises units that are formed of an adsorbent for adsorbing molecular contaminants or an adsorbent for adsorbing water, said units being arranged in series.

[12] A batch type temperature swing adsorption apparatus of [10] or [11], wherein measurement signals from pressure sensors of said first valve and said second valve are inputted to said switching controller.

[13] A batch type temperature swing adsorption apparatus of any one of [10] to [12], wherein said regeneration means has a regenerating blower capable of adjusting a flow rate of the regeneration gas in the range that is 0.05 to 1.2 times the flow rate of the treatment gas.

[14] A batch type temperature swing adsorption apparatus of any one of [10] to [13], wherein that the flow rate of the treatment gas and the flow rate of the regeneration gas are adjusted to ensure that they come to be equal to each other, and further the static pressure of the treatment gas and the static pressure of the regeneration gas are adjusted to ensure that they come to be equal to each other, before the switching of the adsorption/regeneration modes, and then the switching of adsorption/regeneration modes are made.

[15] A batch type temperature swing adsorption apparatus of any one of [10] to [14], wherein the pressure difference (pressure loss) of the flow of the treatment gas flowing in a flow passage from the first-valve inflow port L1 to the second-valve outflow port L3, the pressure difference (pressure loss) of the flow of the regeneration gas flowing from the inflow port L1 of the second valve to the outflow port L3 of the second valve and the pressure differential (pressure loss) of the flow of the regeneration gas flowing from the inflow port L1 of the second valve to the outflow port L3 of the first valve are adjusted before said switching of the adsorption/regeneration modes to ensure that they come to be equal to one another.

[16] A batch type temperature swing adsorption apparatus of any one of [10] to [15], which is an air cleaning apparatus, a dry air supply apparatus, a clean temperature-controlled/humidity-controlled air supply apparatus, a cleaning nitrogen gas supply apparatus, a dry nitrogen gas supply apparatus, or a clean temperature-controlled/humidity-controlled nitrogen gas supply apparatus.

C. According to this invention, further, the following method of supplying clean air, dry air or the like is provided.

[17] A method of supplying a clean electronic-parts manufacturing plant or clean semiconductor devices manufacturing plant or facilities having a constitution including at least one of a clean room, a clean booth, a clean bench, apparatuses for manufacturing an electronic parts, including a semiconductor devices manufacturing apparatus, a liquid crystal display manufacturing apparatus, an organic EL display manufacturing apparatus, a clean tunnel, a clean oven, a storage warehouse for the protection of process substrates, a stocker, a transfer unit as an accessory to a manufacturing apparatus, a loader/unloader, an enclosure, an inspection apparatus and an auxiliary machine, with clean air, dry air, clean temperature-controlled/humidity-controlled air, a cleaning nitrogen gas, a dry nitrogen gas or a clean temperature-controlled/humidity-controlled nitrogen gas by means of any one of the apparatuses recited in [16].

D. Further, according to this invention, the following clean electronic part manufacturing plant or clean semiconductor manufacturing plant or facilities are provided.

[18] A clean electronic-parts manufacturing plant or clean semiconductor devices manufacturing plant or facilities having a constitution including at least one of a clean room, a clean booth, a clean bench, apparatuses for manufacturing an electronic parts, including a semiconductor devices manufacturing apparatus, a liquid crystal display manufacturing apparatus, an organic EL display manufacturing apparatus, a clean tunnel, a clean oven, a storage warehouse for the protection of process substrates, a stocker, a transfer unit as an accessory to a manufacturing apparatus, a loader/unloader, an enclosure, an inspection apparatus and an auxiliary machine, the clean electronic-parts manufacturing plant or clean semiconductor devices manufacturing plant or facilities having at least one of the air cleaning apparatus, the dry air supply apparatus, the clean temperature-controlled/humidity-controlled air supply apparatus, the cleaning nitrogen gas supply apparatus, the dry nitrogen gas supply apparatus and the clean temperature-controlled/humidity-controlled nitrogen gas supply apparatus recited in [16].

ADVANTAGEOUS EFFECT OF THE INVENTION

According to the automatic four-port selector valve of this invention, by using only two selector valves thereof, there can be constructed a batch type temperature swing adsorption (TSA) line having two lines of adsorbent units equivalent to a conventional batch type temperature swing adsorption line that requires eight on-off valves, eight branching/confluent points and the arrangement of complicated and long ducts. Further, the conventional arrangement of ducts having a large occupation space can be greatly reduced.

Moreover, all of the eight branching/confluent points in the prior art can be eliminated.

Therefore, standing or "stagnant" places where treatment gas or regeneration gas does not flow and stays can be eliminated.

Therefore, there can be realized a remarkably simple batch type temperature swing adsorption (TSA) line, and when this line is employed as an apparatus, the apparatus is compact and less expensive.

In the automatic four-port selector valve of the invention, the top plate, bottom plate, side plate, framed partition plates, rotation shaft and plate-shaped turnable valve bodies which constitute the casing body thereof can be provided with heat-insulating functions. Even when high-temperature regeneration gas and low-temperature treatment gas or supply air flow adjacently simultaneously in the valve, therefore, the top plate, side plate, bottom plate, framed partition plates, rotation shaft and plate-shaped turnable valve bodies are inhibited from constituting heat-conducting surfaces and transferring heat from the high-temperature gas to the low-temperature gas, so that the removal by adsorption and desorption/regeneration can be simultaneously performed without suffering from any heat transfer influence.

Moreover, the flow rates, pressures (static pressure) and pressure differences of the treatment air and the regeneration air are controlled so that they come to be equal flow rates, equal static pressures and equal pressure differences before the switching of the adsorption/regeneration modes, and it is secured that the driving motors for the two switching valves are simultaneously actuated and simultaneously stopped, and they operate for a short period of time of 0.1 to 20 seconds, so that the flow rates, static pressures and pressure differences in the switching operation are within tolerant accuracies.

When the automatic four-port selector valve of this invention is used, there can be provided not only a cleaning apparatus for supplying a clean room, a clean chamber or a mini-environment with air or gas of which molecular contaminants are removed to the level of ppb but also a clean temperature-controlled/humidity-controlled air or gas supply apparatus for supplying air or gas that has molecular contaminants removed and is further temperature-controlled/humidity-controlled air or an apparatus for supplying dry air or dry gas of which the water content is removed to a dew point of −80° C. or lower, as a compact apparatus based on the batch type temperature swing adsorption (TSA) for supplying air or gas while controlling or suppressing variations in flow rates, static pressures and pressure differences within tolerant accuracies.

When these compact and less expensive apparatuses are used, not only clean air, nitrogen gas or dry air or clean temperature-controlled/humidity-controlled air or nitrogen gas can be supplied to a clean room or a mini-environment in which an apparatus for manufacturing semiconductors is provided, but also the above air or nitrogen gas can be easily supplied to a plant or facilities for manufacturing electronic parts, which plant or facilities are constituted of a clean room, a clean booth, a clean chamber and various machines and equipment such as an apparatus for manufacturing semiconductors, liquid crystal displays or organic EL displays, a clean tunnel, a loader/unloader, an enclosure, an inspection apparatus, a stocker, and the like, and which constantly require the space of a clean atmosphere, so that this invention can greatly contribute to improvements in yields of those products.

BRIEF DESCRIPTION OF DRAWINGS

In FIGS. 1 to 14, 101 indicates a treatment air inlet, 102 indicates a treatment air filter, 103 indicates a treatment air blower, 104 indicates a treatment air flow rate sensor, 105 indicates a treatment air damper, 106 indicates a treatment air duct, 107 indicates a first-valve pressure sensor, 108 indicates a first valve (first-line valve), 109 indicates a first-line adsorbent unit, 110 indicates a first-line duct, 111 indicates a second valve (second-line valve), 112 indicates a second-valve pressure sensor, 113 indicates an exhaust air duct, 114 indicates an exhaust air outlet, 115 indicates a supply air duct, 116 indicates a supply air outlet, 117 indicates a second-line duct, 118 indicates a second-line adsorbent unit, 119 indicates a regeneration air inlet, 120 indicates a regeneration air duct, 121 indicates a regeneration air filter, 122 indicates a regeneration air blower, 123 indicates a regeneration air flow rate sensor, 124 indicates a regeneration air damper, 125 indicates a regeneration air cooler or cooling unit, 126 indicates a regeneration air pre-heater, 127 indicates a regeneration air heater, 128 indicates a supply air filter, 129 indicates a switching controller, 130 indicates an air cleaning apparatus (FIG. 9), 131 indicates a driving portion (driving means), 132a to 132d indicate framed partition plates, 133a to 133d indicate framed valve seats, 134a and 134b indicate plate-shaped turnable (rotating) valve bodies, 135 indicates a box (casing) body, 136 indicates a top plate, 137 indicates a bottom plate, 138 indicates a rotation shaft, 139a to 139d indicate opening portions, 140 indicates an electric motor, 141 indicates a side plate, 150a to 150d indicates first-valve (first-line valve) movable plates (for adjusting a pressure or changing an opening ratio), 150a' to 150d' indicate second-valve (second-line valve) movable plates (for adjusting a pressure or changing an opening ratio), 151a to 151d indicate first-valve actuators, 151a' to 151d' indicate second-valve actuators, 154 indicates a gasket ditch, 155 indicates air flowing out of the treatment air duct, 156 indicates air flowing into the first-line duct, 157 indicates air flowing out of the second-line duct, 158 indicates air flowing into the exhaust duct, 159 indicates air flowing out of the first-line duct, 160 indicates air flowing into the air supply duct, 161 indicates air flowing out of the regeneration air duct, 162 indicates air flowing into the second-line duct, 163a indicates a first-line No. 1 dehumidification unit, 163b indicates a second-line No. 1 dehumidification unit, 164a indicates a first-line No. 2 dehumidification unit, 164b indicates a second-line No. 2 dehumidification unit, 165a indicates a first-line heater, 165b indicates a second-line heater, 166a indicates a first-line cooler, 166b indicates a second-line cooler, 167a indicates a first-line divider, 167b indicates a second-line distributor, 168 indicates a first on-off valve, 169 indicates a second on-ff valve, 170a indicates a first-line cleaning unit, 170b indicates a second-line cleaning unit, 171 indicates a treatment air cooler, 173 indicates a supply air cooler, 174 indicates a supply air humidifier, 175 indicates a supply air blower, 180 indicates a dry air supply apparatus shown in FIG. 13, 190 indicates a clean temperature-controlled/humidity-controlled air supply apparatus shown in FIG. 14, 200 indicates a prior art air cleaning apparatus shown in FIG. 6, F1 and F2 indicate flow rate measurement values, G1 to G13 indicate control signals, L1 indicates an inflow port (dedicated inflow port), L2 indicates an inflow/outflow port (1) (inflow/outflow dual port), L3 indicates an outflow port (dedicated outflow port), L4 indicates an inflow/outflow port (2) (inflow/outflow dual port), P1 and P2 indicate static pressure measurement values, Pw indicate a pressure in the inflow port, Px indicates a pressure in the inflow/outflow port (1), Py indicates a pressure in the outflow port, Pz indicates a pressure in the inflow/outflow port (2), R1 to R4 indicate small rooms, T1 to T8 indicate branching/confluent points and V1 to V8 indicate on-off valves.

BEST MODE FOR CARRYING OUT THE INVENTION

Figure 1:
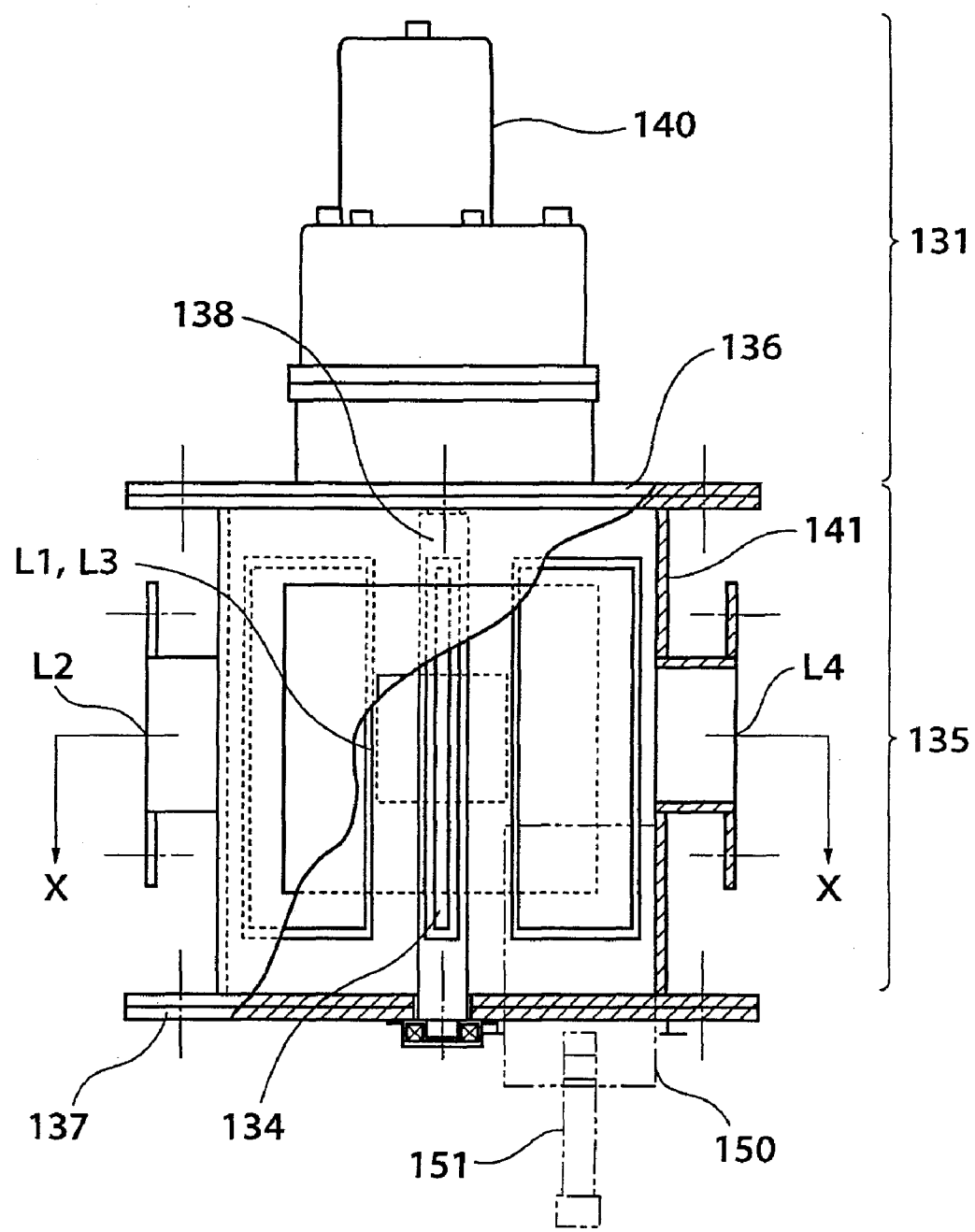
FIG. 1 is a schematic vertical cross-sectional view of part of one side showing one embodiment of the automatic four-port selector valve of this invention.
Figure 2:
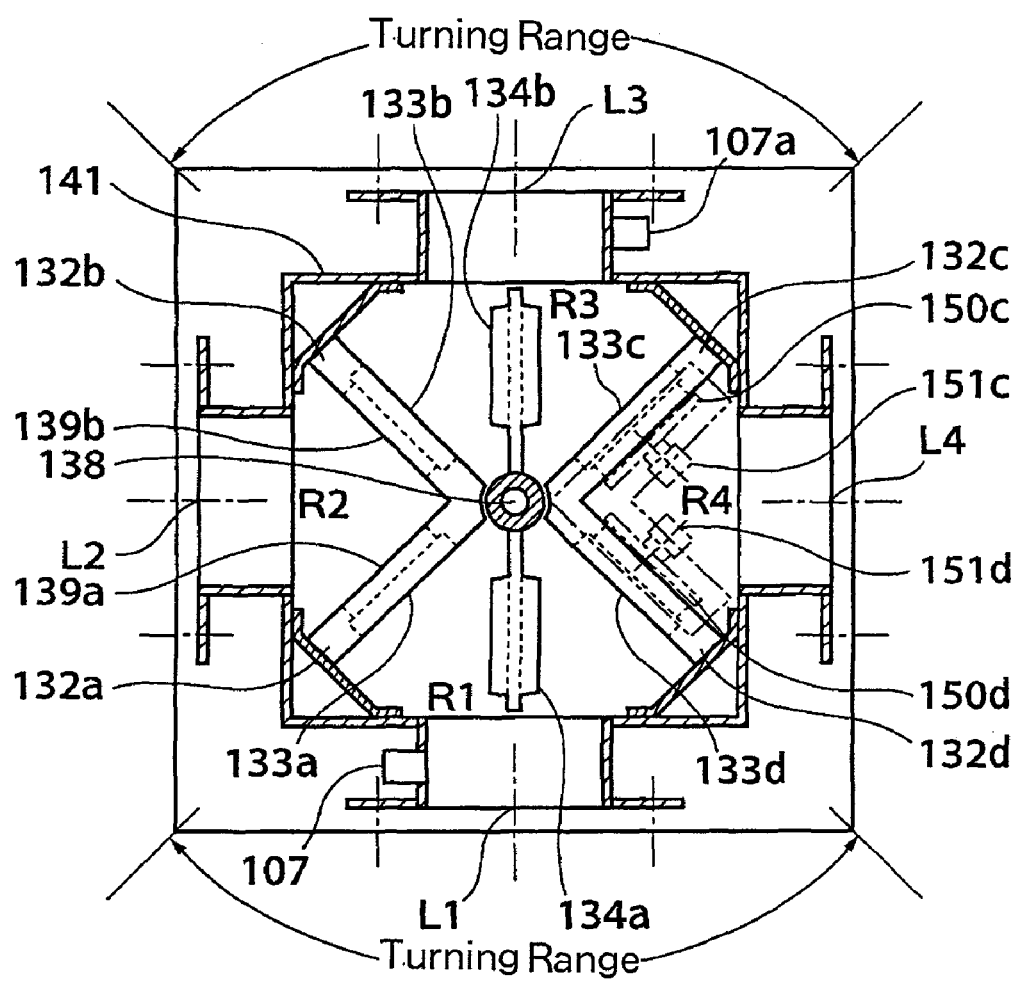
FIG. 2 is an X-X cross-sectional view of the valve shown in FIG. 1.

This invention will be explained in detail hereinafter with reference to drawings. FIGS. 1 and 2 show one embodiment of the automatic four-port selector valve of this invention.

The automatic four-port selector valve of this invention in principle has a casing (box) body or portion having a space portion in its inside, framed partition plates for dividing the above space into four rooms R1, R2, R3 and R4, the partition plates having opening portions, plate-shaped turnable or rotating valve bodies for opening or closing (or occluding) the opening portions of the framed partition plates, an inflow port L1 for always letting a gas flow in through it in any instance, an inflow/outflow port (1) L2 for letting a gas flow in and flow out through it alternately, an outflow port L3 for always letting a gas flow out through it in any instance, an inflow/outflow port (2) L4 for letting a gas flow in and flow out through it alternately with the above port L2, these ports being provided in the above divided four rooms, and a driving means for turning the above plate-shaped turnable or rotating valve bodies about a rotation axis.

More specifically, as shown in the drawings, the present automatic four-port selector valve is constituted of a casing (box) body 135 to which the inflow port L1, the inflow/outflow port (1) L2, the outflow port L3 and the inflow/outflow port (2) L4 are provided, framed partition plates 132 (132a, 132b, 132c and 132d) for forming four separate small rooms in an internal space surrounded by a top plate 136, a bottom plate 137 and side plates 141, plate-shaped turnable valve bodies 134a and 134b, a rotation shaft 138 to which the plate-shaped turnable valve bodies 134 are attached and a driving unit (driving means) 131 having an electric motor 140, the driving unit being installed on the top plate 136. The casing body 135 shown in the drawings having the form of a regular tetragon having the top plate 136 on the upper end and the bottom plate 137 on the lower end, and the four side plates 141 are provided with the inflow port L1, the inflow/outflow port (1) L2, the outflow port L3 and the inflow/outflow port (2) L4, respectively.

DEFINITIONS AND FUNCTIONS OF INFLOW PORT, ETC

The following definitions will apply in the present specification.

"Inflow port" refers to a port through which "in any instance a gas always flows in" and will be also referred to as "dedicated inflow port".

"Outflow port" refers to a port through which "a gas always flows out in any instance" and will be also referred to as "dedicated outflow port".

"Inflow/outflow port" refers to a port through which a gas flows in and flows out, and which is for letting a gas flow in through it in one instance (in one steady state operation) and flow out through it in the other instance alternately (in the another steady state operation), and it will be also referred to as "inflow/outflow dual port".

The valve of this invention is constituted to ensure that (in a steady state) a gas that flows in through the above "dedicated inflow port" flows out of the above "inflow/outflow port" and that a gas that flows in through the above "inflow/outflow port" flows out of the above "dedicated outflow port".

Figure 8:
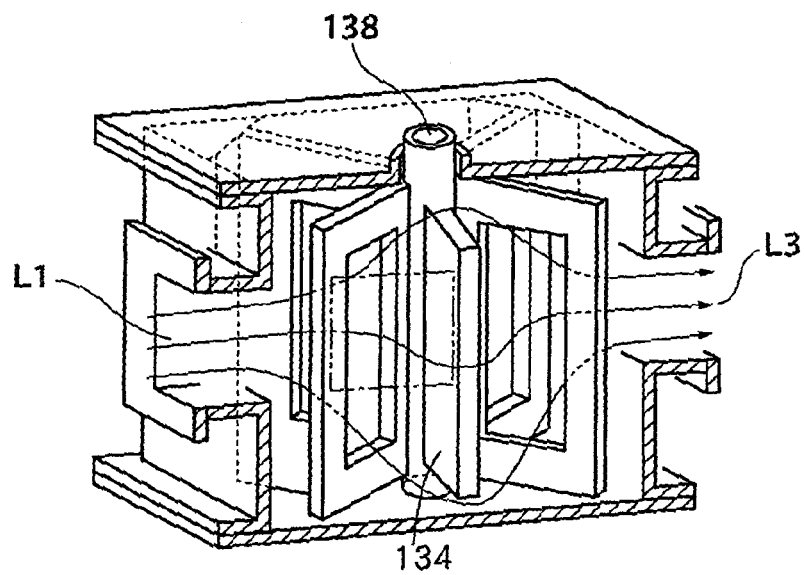
FIG. 8 shows diagrams for explaining flowing states of treatment gas in the automatic four-port selector valve of this invention in switching of lines (switching of adsorption/regeneration mode in lines), in which (A) is a partial exploded perspective view and (B) is a cross-sectional view.
Figure 8:
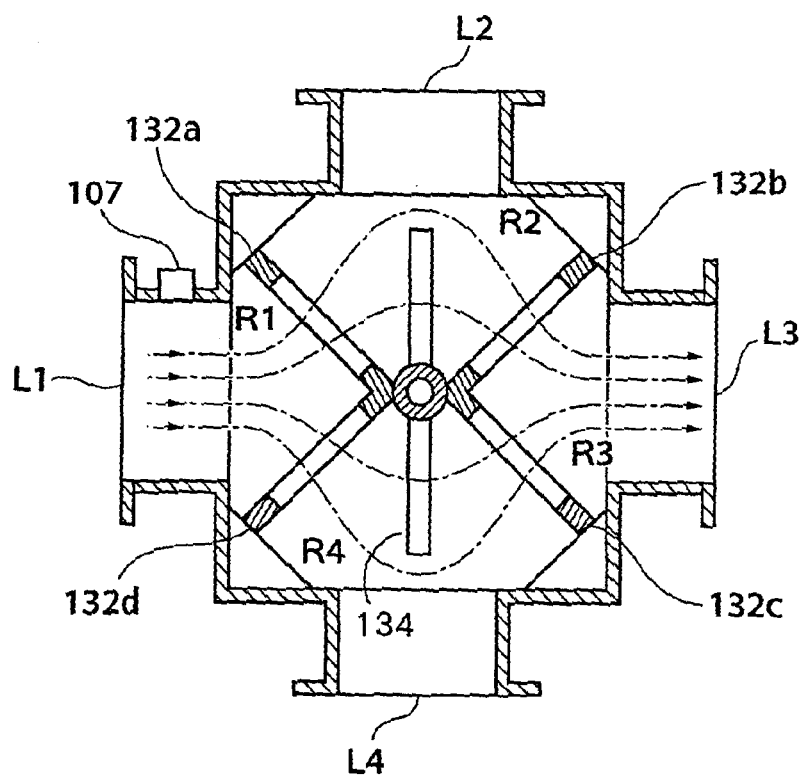

The most characteristic feature of the valve of this invention is that it is only for just a moment when flow passages are switched that a gas flows from the above "inflow port" to the "outflow port". FIG. 8 shows this state as will be explained in detail later.

The "gas" generally refers to air, while it may be any other inert gas including nitrogen, helium, neon, argon, krypton, xenon and the like. Descriptions hereinafter will discuss cases when air is treated, while it does not mean that the gas is limited to air and it should be understood that the gas includes other gases such as nitrogen and the like.

Figure 3:
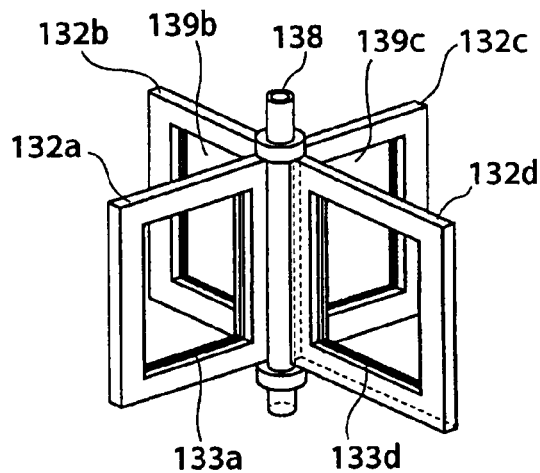
FIG. 3 show perspective views and a partially enlarged view for more specifically explaining framed partition plates (A), plate-shaped or plate-like turnable or rotation valve bodies (B) and framed valve seats (C) shown in FIGS. 1 and 2.
Figure 3:
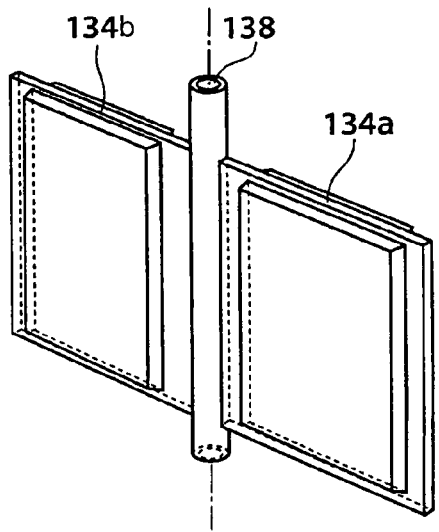
Figure 3:
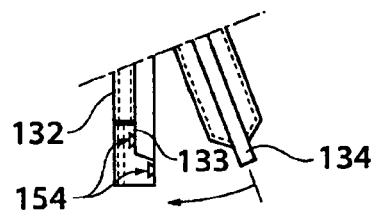

The internal space of the casing body 135 is separated with four framed partition plates 132a to 132d around the rotation shaft 138 to provide four small rooms (the small rooms are R1, R2, R3 and R4 in the clockwise order when viewed from above as shown in FIG. 2). As shown in FIGS. 1 to 3, the four framed partition plates 132a to 132d are provided with opening portions 139a to 139d for example in their central portions, and framed valve seats 133a to 133d are formed in inner-edge circumferential portions thereof. Further, to the rotation shaft 138 are attached the plate-shaped turnable or rotating valve bodies 134a and 134b that open or close the above opening portions, and there is provided a mechanism in which the top end portion of the rotation shaft 138 is projected through a shaft hole made in the center of the top plate 136 and a driving power outputted from the driving unit 131 installed on the top plate 136 is conducted to the rotation shaft 138.

Further, FIG. 2 also shows turn range (or rotational range) of the plate-shaped turnable valve bodies 134a and 134b, and the turn angle is 90°.

As shown in FIG. 2, pressure sensors 107 are attached to the inflow port L1 and the outflow port L3. However, when such a pressure sensor is attached to a flow passage connected to the outflow port L3, it is not required to attach the pressure sensor 107a to the outflow port L3. When the pressure sensor is attached to a port, it may be attached in the vicinity of the port.

As shown in FIGS. 1 and 2, further, movable plates 150 (150c and 150d) and their actuators 151 (151c and 151d), which are movable vertically along the inner wall surface of the small room R4, are employed.

(Heat Insulating Mechanism)

The heat-insulating function of the automatic four-port selector valve of this invention will be explained below.

The rotation shaft 138 shown in FIGS. 1 and 2 is preferably provided with a heat-insulating function. For example, a hollow shaft made of stainless steel is used, and the surface thereof is polished or plated to impart the shaft with a heat-insulating function.

Further, the side plates 141, the top plate 136, the bottom plate 137, which constitute the casing 135 the framed partition plates 132 (132a, 132b, 132c and 132d), the plate-shaped turnable valve bodies 134 (134a and 134b) and the framed valve seats 133 (133a, 133b, 133c and 133d), shown in these drawings, are preferably made from frame materials and thin-plate materials as main components to ensure that they are so constructed to form a hollow structure. As these materials, stainless steel materials having a relatively low thermal conductivity are desirably used. The surface of each of these constituting materials or members is preferably polished or plated to impart them with a heat-insulating function like the rotation shaft 138. Each hollow portion is preferably charged or packed with a heat-resistant heat-insulating material to ensure that they exhibit the heat-insulating function. Further, these constituting members are designed and made so that they maintain airtightness and pressure resistance, vacuum heat insulation can be employed. On the other hand, the outer surface of the casing body is preferably jacketed equipped with a heat-insulating material.

The framed partition plates 132, the plate-shaped valve bodies 134 and the framed valve seats 133 shown in FIGS. 1 and 2 are more specifically shown in FIGS. 3(A), 3(B) and 3(C).

That is, FIG. 3(A) is a perspective view of the framed partition plates 132a to 132d of the automatic four-port selector valve of this invention, FIG. 3(B) is a perspective view of the plate-shaped turnable valve bodies 134, and FIG. 3(C) is a partially enlarged view of the framed valve seat 133.

In a gasket ditch 154 shown in FIG. 3(C), two ribbon-shaped gaskets having low thermal conductivity and heat resistance are embedded along the entire circumference of the framed valve seats 133a to 133d. It is ensured that when the plate-shaped turnable valve bodies 134a and 134b are actuated and fitted in the framed partition plates 132b and 132d shown in FIG. 2 to come to a stop, the plate-shaped turnable valve bodies 134a and 134b and the framed valve seats 133b and 133d come in contact respectively through the above two gaskets, and the contact area of the framed valve seats 133 and the plate-shaped turnable valve bodies 134 is reduced to the limit. Thus, the transfer of heat between the framed partition plates 132b and 132d and the plate-shaped turnable valve bodies 134a and 134b is remarkably small.

The forms and structures of the framed partition plates 132a to 132d and the plate-shaped turnable valve bodies 134a and 134b shall not be limited to those shown in FIG. 3 and they may take various forms and structures so long as they do not deviate from the gist of this invention.

(Movable Plates for Pressure Adjustment)

Figure 4:
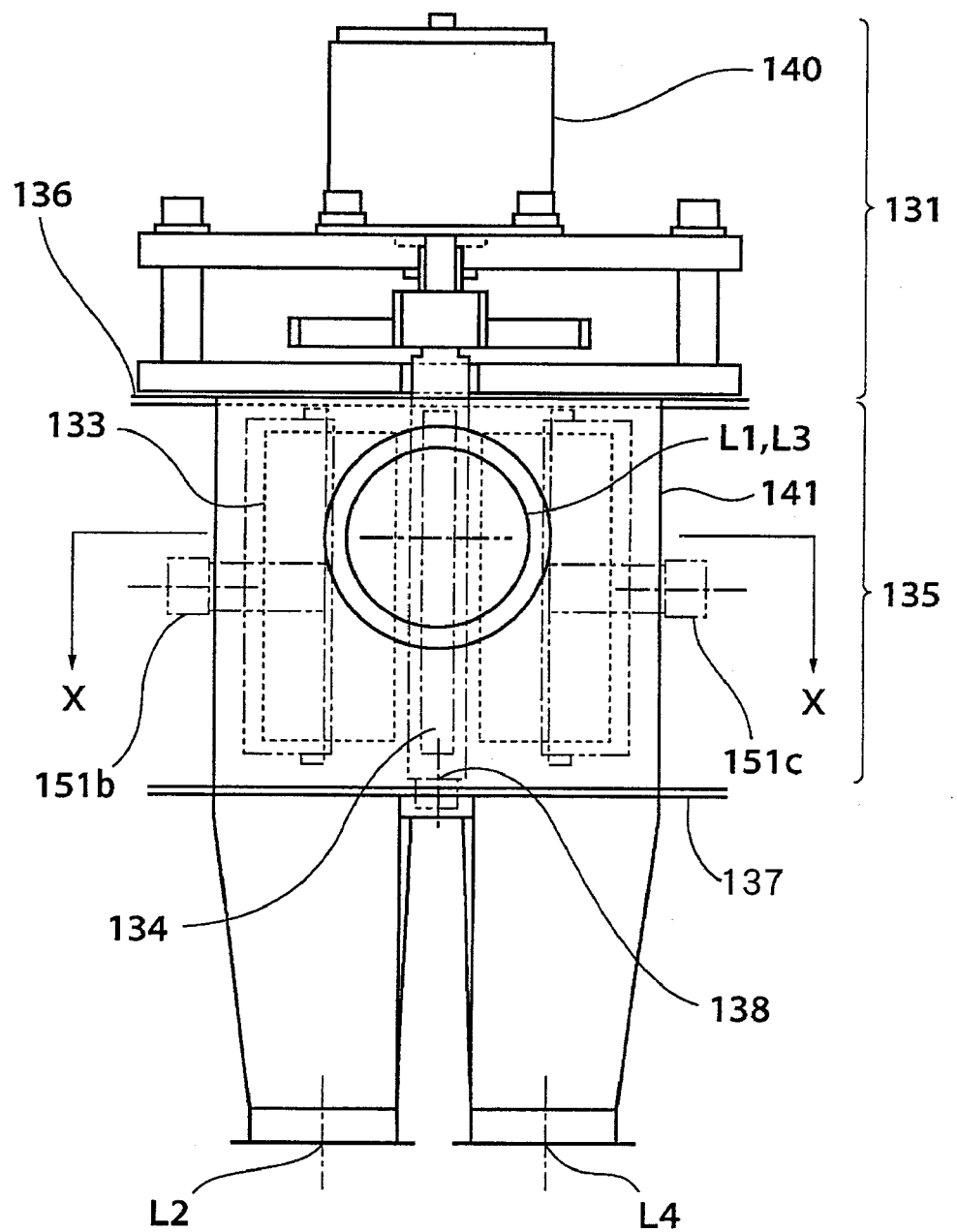
FIG. 4 is a side view of an embodiment that is an automatic four-port selector valve of this invention and has the form of a circle in cross section.
Figure 5:
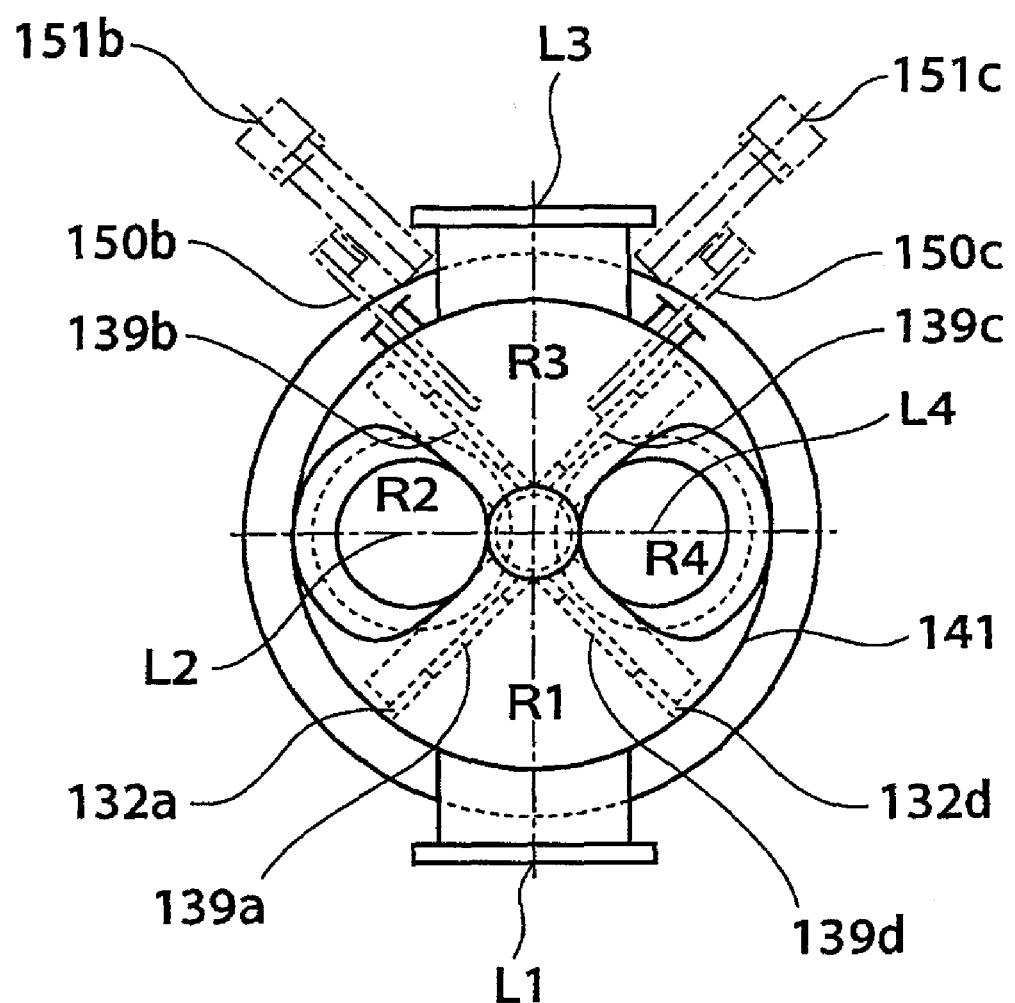
FIG. 5 is an X-X cross-sectional view of the valve shown in FIG. 4.

FIG. 4 shows a schematic diagram of another embodiment of the automatic four-port selector valve of this invention, which has the form of a circle in cross-section, different from the above embodiment, and FIG. 5 shows a cross-sectional view taken along X-X therein.

These Figures show an example in which the inflow port L1 and the outflow port L3 are attached to a side plate 141 and the inflow/outflow port (1) L2 and the inflow/outflow port (2) L4 are attached to a bottom plate 137. Movable plates 150b and 150c are attached in a manner that they are movable in the horizontal direction along the inner wall of a small room R3, and the plate-shaped turnable valve bodies 134 (134a and 134b) are attached to a rotation shaft 138 in a manner that they are arranged or disposed in small rooms R2 and R4.

When gas flow passages are switched with the automatic four-port selector valve shown in FIGS. 4 and 5, the plate-shaped turnable valve bodies are actuated at a initial position where opening portions 139a and 139c are closed and they are rotated to turn to a position where opening portions 139b and 139d are to be closed. In this case, since the opening portion 139c is already closed, the flow from L2 to L3 and the flow from L1 to L4 are not disturbed, and when the adjustment of a pressure difference is required, preferably, the movable plate 150c is beforehand moved to a position where the area of the opening portion 139c becomes, for example, 50%. In this manner, when the operation time period of the plate-shaped turnable valve bodies is, for example, 1 second long, the movable plate 150c also moves for 1 second, and the area of the above opening portion 139c is restored to 100%.

(States of Gas Flow, Etc., in Switching of Gas Flow Passage, α Type)

With regard to an α type valve (type α valve) in which the plate-shaped turnable valve bodies 134a and 134b of the automatic four-port selector valve of this invention are arranged in the small rooms R2 and R4 (to be sometimes simply referred to as "α type" hereinafter) and a β type valve (type β valve) in which the plate-shaped turnable valve bodies are arranged in the small rooms R1 and R3 (to be sometimes simply referred to as "β type" hereinafter), the state of gas flow in switching a gas flow passage, the movement position of the movable plates that move vertically, the flow rate adjustment and the static pressure adjustment will be further explained below with reference to FIGS. 7 and 8.

For explanations, there is taken up an example in which the two automatic four-port selector valves of this invention are combined and applied in combination to valves for a batch type temperature swing adsorption apparatus. A first valve will be mainly explained, and a detailed explanation of a second valve will be omitted since the explanation of the second valve is substantially the same as the explanation of the first valve.

Figure 7:
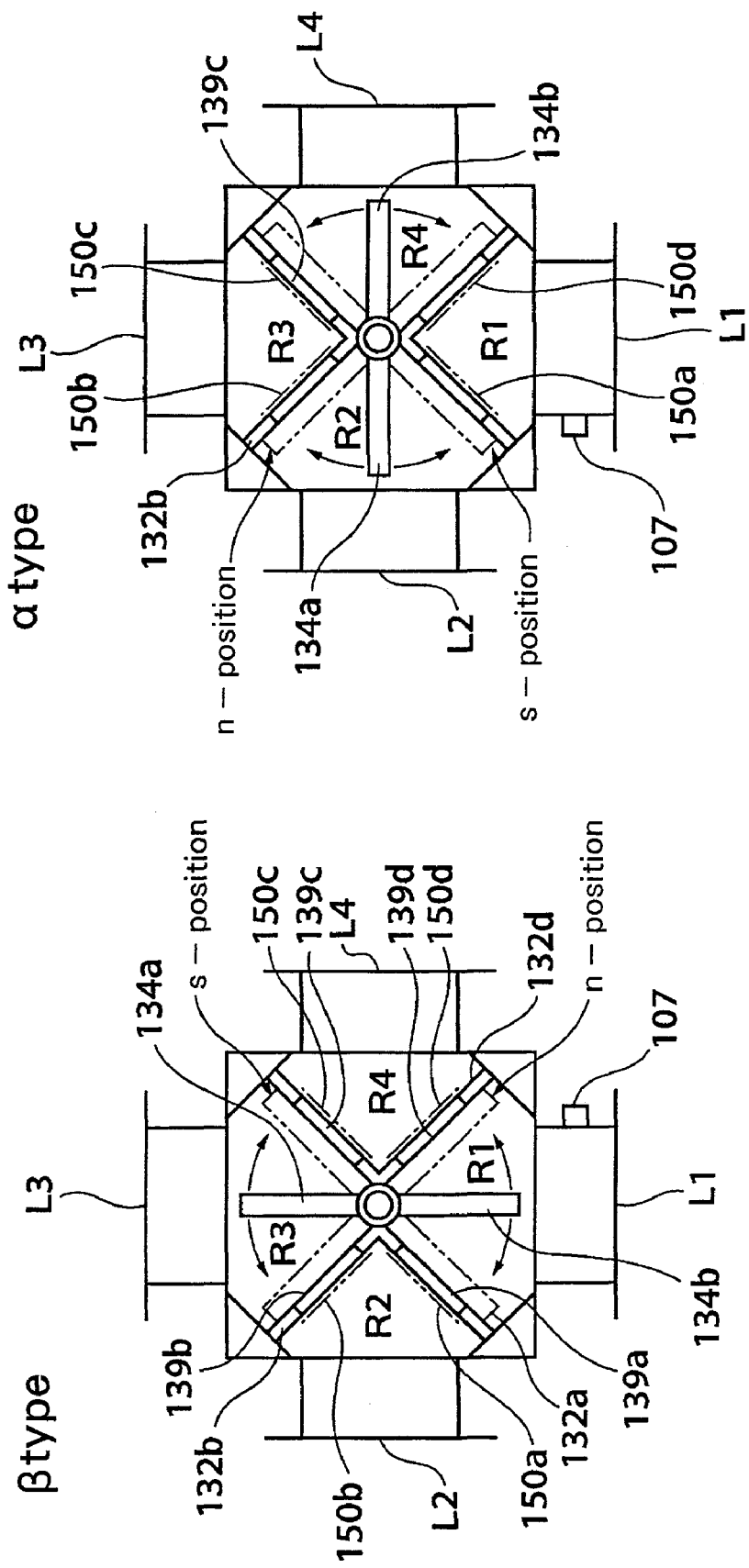
FIG. 7 shows cross-sectional views of two types (α type and β type) of the automatic four-port selector valve of this invention.

In the α type shown in FIG. 7 (reference numerals for indicating parts are common to the α type and β type), the plate-shaped turnable valve bodies 134a and 134b are arranged or disposed in the small rooms R2 and R4 and they have a turn angle of 90°. When the plate-shaped turnable valve bodies 134a and 134b are in a position where the plate-shaped turnable valve body 134a has closed the opening portion 139b of the framed partition plate 132b and the plate-shaped turnable valve body 134b has closed the opening portion 139d of the framed partition plate 132d, this case will be referred to as "n-position" of the plate-shaped turnable valve bodies 134. When the plate-shaped turnable valve bodies 134a and 134b are in a position where the plate-shaped turnable valve body 134a has closed the opening portion 139a of the framed partition plate 132a and the plate-shaped turnable valve body 134b has closed the opening portion 139c of the framed partition plate 132c, this case will be referred to as "s-position" of the plate-shaped turnable valve bodies 134.

The "switching of gas flow passage" as used in this invention refers to a change of positions of the plate-shaped turnable valve bodies, that is, a position change between the n-position and the s-position. Further, this switching of gas (air) flow passage is synonymous with the adsorption/regeneration modes change.

In the switching of the gas flow passage, when the plate-shaped turnable valve bodies 134 of the valve are in the n-position, treatment gas is flowing in through the dedicated inflow port L1 and flowing out of the inflow/outflow port L2 immediately before the procedure of switching the gas flow passage is undertaken. At the same time, regeneration gas is flowing in through the inflow/outflow port L4 and flowing out of the dedicated outflow port L3.

The flow rate of a gas flowing in through the inflow port L1 and the flow rate of a gas flowing in through the inflow/outflow port L4 are adjusted to be equal or same flow rate with flow rate measuring/adjusting means. Further, since the opening portion 139a is 100% open, the movable plate 140a for pressure adjustment is in a 0% movement position, and similarly since the opening portion 139c is 100% open, the movable plate 150c for pressure adjustment is also in a 0% movement position.

As described above, the procedure of switching the gas flow passage refers to the procedure of turning the plate-shaped turnable valve bodies 134 from the n-position to the s-position by 90° for letting treatment gas flow in through the dedicated inflow port L1 and flow out through the inflow/outflow port L4 and simultaneously letting regeneration gas flow in through the inflow/outflow port L2 and flow out through the dedicated outflow port L3.

The flow rate of a gas that flows in through L1 and the flow rate of a gas that flows in through L2 are adjusted to equal flow rates with flow rate measuring/adjusting means.

In this invention, the static pressure is adjusted with its measuring/adjusting means for ensuring that the flow that is flowing from L1 to L2 and the flow that is flowing from L4 to L3 are stopped immediately upon the spacing or departing of the plate-shaped turnable valve bodies 134a and 134b from the framed valve seats 133b and 133d when they are actuated to change their positions. By the above static pressure adjustment, a flow from L1 to R3 through R1 and R2 and from R3 to L3 and a flow from L1 to R3 through R1 and R4 and from R3 to L3, i.e., the flows from L1 to L3 take place for a short period of time of the above position change.

FIGS. 8(A) and 8(B) show a state where the flow from the dedicated inflow port L1 to the dedicated outflow port L2 takes place only during the above switching. However, FIG. 8 shows the state of treatment gas that is flowing in through L1 at a time when the plate-shaped turnable valve bodies 134 that is to turn 90° has turned just half at an angle of 45°.

Meanwhile, when the plate-shaped turnable valve bodies 134 are actuated to cause a flow from the dedicated inflow port L1 to the dedicated outflow port L3, four opening portions 139a, 139b, 139c and 139d are open as such, so that a variation in static pressure takes place, in which the static pressure in the outflow port L3 hence increases in this state, and when the plate-shaped turnable valve bodies 134 come to a stop to complete or finish the switching of the gas flow passage (position change), the static pressure decreases. Thus, the static pressure in L3 is required to be maintained at the same static pressure that the flow from L2 to L3 has before the switching of the gas flow passage.

For maintaining the static pressure, it is advisable the movable plates 150b and 150d for pressure adjustment can be beforehand moved and adjusted to a position thereby attaining necessary opening ratios of the opening portions 139b and 139d before the plate-shaped turnable valve bodies 134 are actuated. When it is required to adjust the opening ratios to 70%, the movable plates are moved to a position at which the opening ratios are decreased by 30%.

The automatic four-port selector valve of this invention has a remarkable feature that when the gas flow passages are switched (the adsorption/regeneration modes is changed), adjusting the opening ratio at 139b and 139d without disturbing the state of the flow from L1 to L2 and the state of the flow from L4 to L3 even if the movable plates 150b and 150d for pressure adjustment are moved. Having the above feature, the automatic four-port selector valve of this invention enables the construction of various apparatuses based on the batch type temperature swing adsorption, which include not only an air cleaning apparatus but also a clean temperature-controlled/humidity-controlled air supply apparatus and a dry air supply apparatus.

In this invention, therefore, the opening portions 139b and 139d are required to have opening ratios of 100% at a time when the plate-shaped turnable valve bodies 134 reach the s-position by turning at 90°, so that the movable plates 150b and 150d for pressure adjustment are moved from the 30% position to the 0% position synchronously with the turning of the plate-shaped turnable valve bodies 134 within a time period for which the plate-shaped turnable valve bodies 134 turn.

If the variation in static pressure in L3 is small when the plate-shaped turnable valve bodies 134 are actuated for position change to cause the flow from L1 to L3, the opening portions can be sufficiently adjusted with either one of the two movable plates 150b and 150d.

Since each movable plate is separately provided with an actuator that is a means for actuating the movable plate, the two movable plates can be simultaneously actuated or one of them can be also separately actuated.

On the other hand, when the plate-shaped turnable valve bodies are in the s-position and the gas flow passage is switched, the flow rate of treatment gas that flows in through the inflow port L1 and the flow rate of regeneration gas that flows in through the inflow/outflow port (1) L2 are adjusted with flow rate measuring/adjusting means before the plate-shaped turnable valve bodies 134 are actuated, and the static pressure is measured and adjusted with its measuring/adjusting means to ensure that the flow from the inflow port L1 to the inflow/outflow port (2) L4 and the flow from the inflow/outflow port (1) L2 to the outflow port L3 come to a stop.

Further, when the plate-shaped turnable valve bodies 134 are actuated and come to a stop, the movable plates 150a and 150c are moved and adjusted to ensure that the opening portions 139a and 139c have opening ratios necessary for maintaining the static pressure in L3.

(States of Gas Flow, Etc., in Switching of Gas Flow passage, β type)

The β type shown in FIG. 7 is in principle the same as the α type, while such will be explained repeatedly for confirmation. In the β type, the plate-shaped turnable valve bodies 134a and 134b are arranged in the small rooms R3 and R1, and they have a turn angle of 90°. When the plate-shaped turnable valve bodies 134a and 134b are in a position where the plate-shaped turnable valve body 134a has closed the opening portion 139b of the framed partition plate 132b and the plate-shaped turnable valve body 134b has closed the opening portion 139d of the framed partition plate 132d, this case will be referred to as "n-position" of the plate-shaped turnable valve bodies 134. When the plate-shaped turnable valve bodies 134a and 134b are in a position where the plate-shaped turnable valve body 134a has closed the opening portion 139a of the framed partition plate 132a and the plate-shaped turnable valve body 134b has closed the opening portion 139c of the framed partition plate 132c, this case will be referred to as "s-position" of the plate-shaped turnable valve bodies 134.

In the β type, when the plate-shaped turnable valve bodies 134 are in the n-position and immediately before the procedure of switching the gas flow passage is undertaken, treatment gas is flowing in through L1 and flowing out of L2 exactly in the same manner as in the above α type. At the same time, regeneration gas is flowing in through L4 and flowing out of L3. And, the flow rate of the flow that is flowing in through L1 and the flow rate of the flow that is flowing in through L4 are adjusted to be equal flow rates with flow rate measuring/adjusting means.

Further, since the opening portion 139a is 100% open, the movable plate 150a is in a 0% movement position, and since the opening portion 139c is also 100% open, the movable plate 150c is also in a 0% movement position.

The procedure of switching the gas flow passage refers to a procedure of turning the plate-shaped turnable valve bodies 134 by 90° turn angle from the n-position to the s-position for letting treatment gas flow in through L1 and flow out through L4 and simultaneously letting regeneration gas flow in through L2 and flow out through L3.

And, the static pressure is adjusted with static pressure measuring/adjusting means to ensure that the flow from L1 to L2 and the flow from L4 to L3 are stopped upon the spacing or departing of the plate-shaped turnable valve bodies 134a and 134b from the framed valve seats 133b and 133d when they are actuated. By the above adjustment, the flow from L1 to L3 takes place.

Meanwhile, when the plate-shaped turnable valve bodies 134 are actuated to cause the flow from L1 to L3, four opening portions 139a, 139b, 139c and 139d are open as such, so that a variation in static pressure takes place, in which the static pressure in L3 increases in this state, and when the plate-shaped turnable valve bodies 134 come to a stop to complete or finish the switching of the gas flow passage, the static pressure decreases. Thus, the static pressure in L3 is required to be maintained at the same static pressure that the flow from L2 to L3 has before the switching of the gas flow passage. In the β type valve, the plate-shaped turnable valve body 134a turns in the small room R3 and the plate-shaped turnable valve body 134b turns in the small room R1, so that the variation in static pressure is greater than that in the α type. In particular, when the plate-shaped turnable valve bodies turn by 45°, the variation is the greatest.

For maintaining the static pressure, the movable plates 150b and 150d are beforehand moved and adjusted to a position to attain necessary opening ratios of the opening portions 139b and 139d before the plate-shaped turnable valve bodies 134 are actuated.

For example, when the opening ratios are required to be 60%, the movable plates 150*b* and 150*d* are beforehand moved to a position at which the opening ratios are decreased by 40%.

As described above, the automatic four-port selector valve of this invention has a feature that when the movable plates 150*b* and 150*d* are moved, those movements can be accomplished without disturbing the state of the flow from L1 to L2 and the state of the flow from L4 to L3. This feature is also true of the β type and enables the construction of various apparatuses based on the batch type temperature swing adsorption.

At a time when the plate-shaped turnable valve bodies 134 reaches the s-position by turning 90° turn angle, the opening portions 139*b* and 139*d* are required to have opening ratios of 100%, so that the movable plates 150*b* and 150*d* are caused to move from the 40% position to the 0% position synchronously with the plate-shaped turnable valve bodies 134 within a time period for which the plate-shaped turnable valve bodies 134 turn.

If the variation in static pressure in L3 is small when the plate-shaped turnable valve bodies 134 are actuated to cause the flow from L1 to L3, the opening portions can be sufficiently adjusted either one of the two movable plates 150*b* and 150*d*.

Since each movable plate is separately provided with an actuator (actuating means) and separately actuated, the two movable plates can be simultaneously actuated or one of them can be also separately actuated.

On the other hand, when the plate-shaped turnable valve bodies are in the s-position and the gas flow passage is switched, the flow rate of treatment gas that flows in through L1 and the flow rate of regeneration gas that flows in through L2 are adjusted with flow rate measuring/adjusting means, and the static pressure is adjusted with its measuring/adjusting means to ensure that the flow from L1 to L4 and the flow from L2 to L3 come to a stop, before the plate-shaped turnable valve bodies 134 are actuated.

Further, when the plate-shaped turnable valve bodies 134 are actuated and come to a stop, the movable plates 150*a* and 150*c* are moved and adjusted to ensure that the opening portions 139*a* and 139*c* have opening ratios necessary for maintaining the static pressure in L3. This adjustment can be carried out without disturbing the states of the flow from L1 to L4 and the flow from L2 to L3.

(Use of First Valve and Second Valve in Combination)

The automatic four-port selector valve of this invention has the above-described flow passage switching function (mode changing function) regardless of the α type or β type. In practical use, it is preferred to use two valves in combination.

Figure 9:
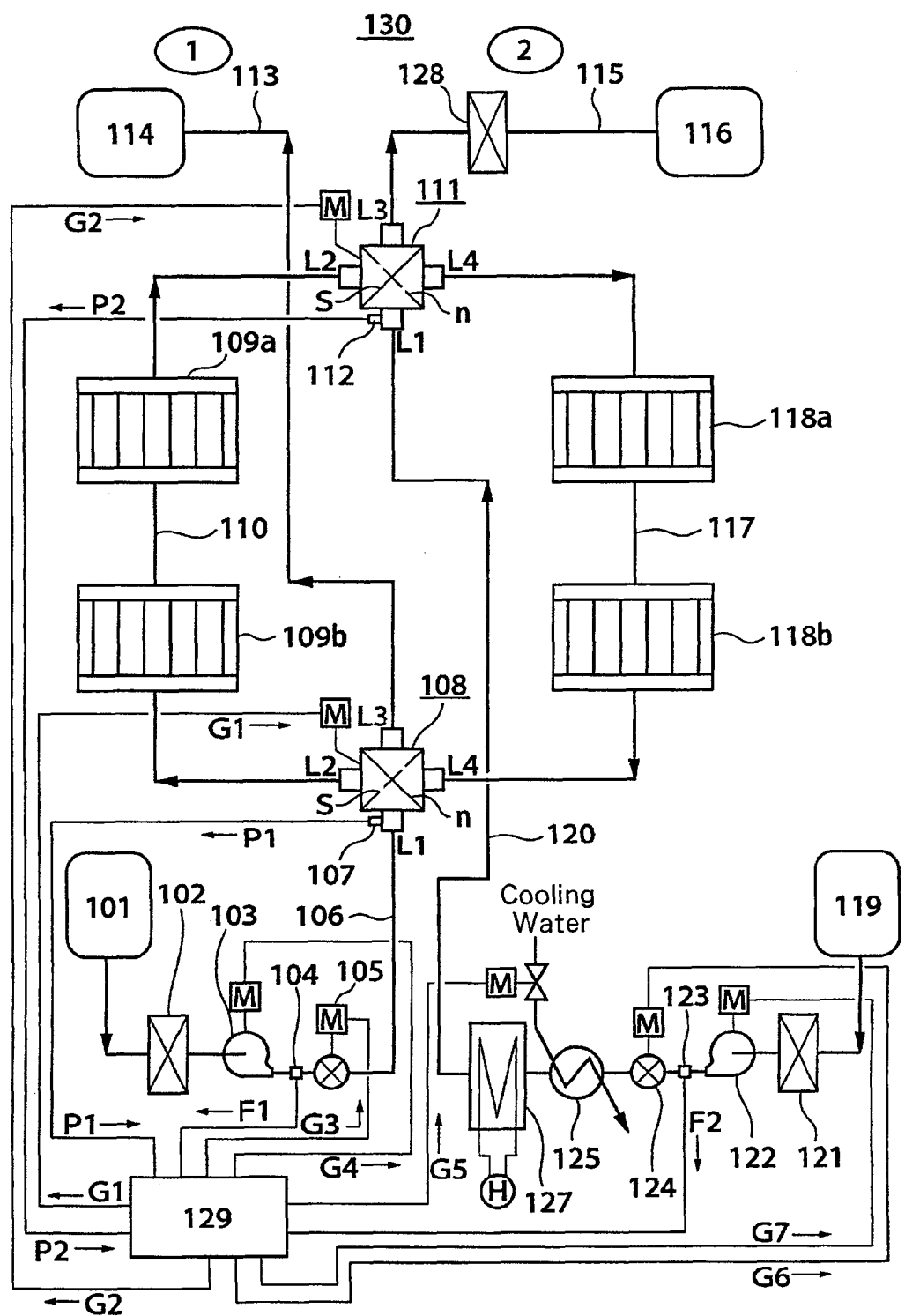
FIG. 9 is a diagram or flow-sheet for explaining an air cleaning apparatus 130 having two automatic four-port selector valves of this invention and having a first line and a second line.
Figure 10:
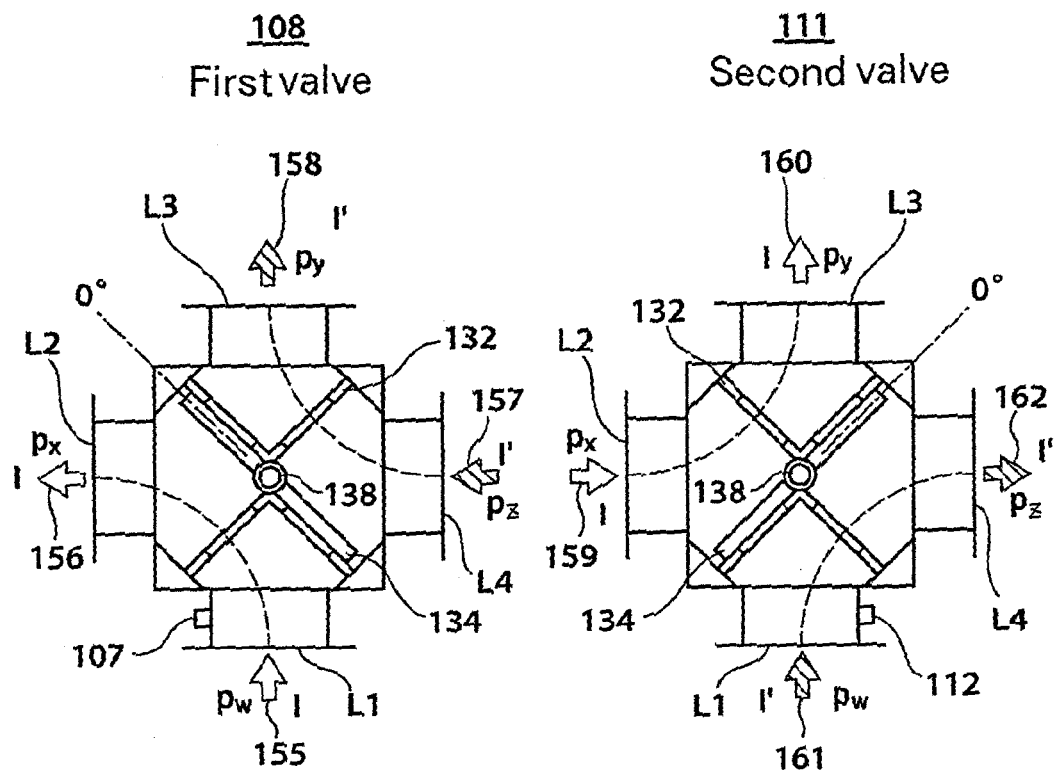
FIG. 10 shows diagrams for explaining directions of flows of air (treatment air and regeneration air) in the switching of the adsorption/regeneration modes.
Figure 10:
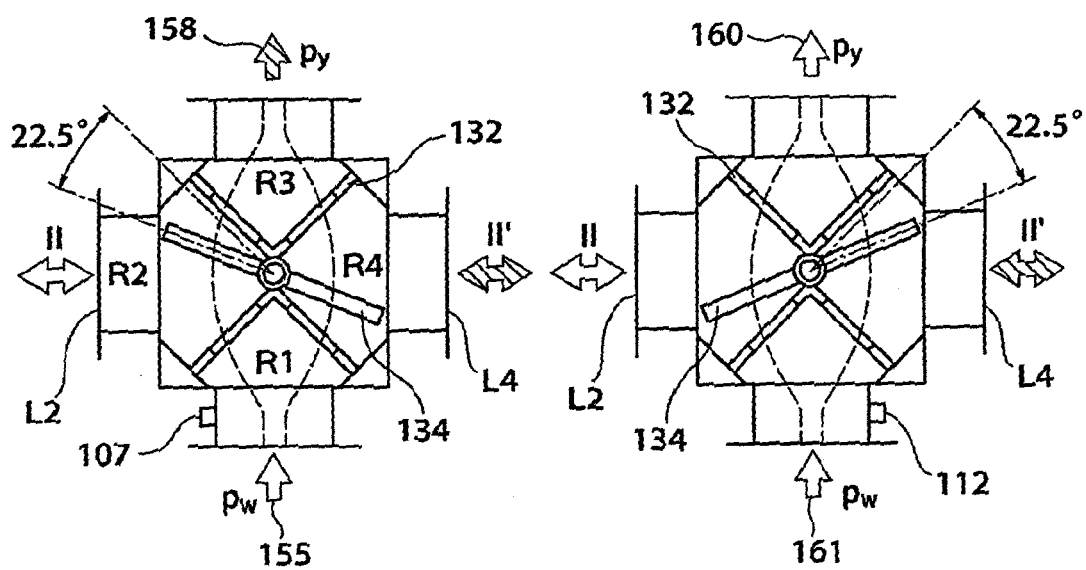
Figure 11:
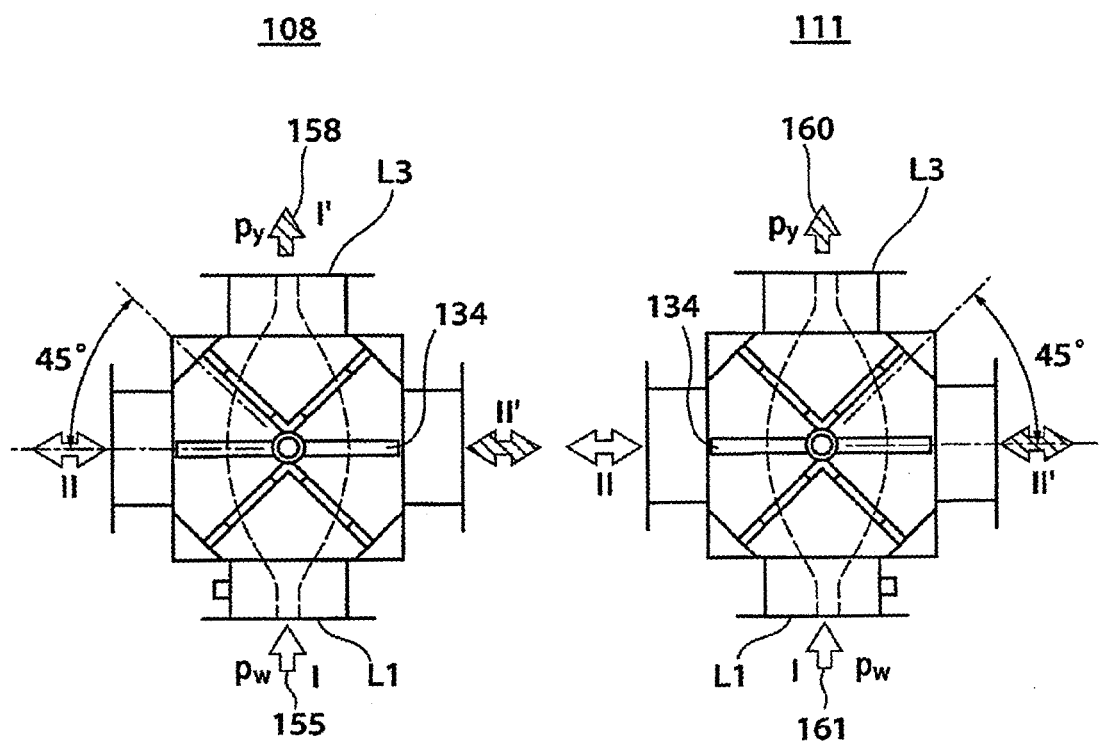
FIG. 11 show diagrams for explaining directions of flows of air (treatment air and regeneration air) in the switching of the adsorption/regeneration modes.
Figure 11:
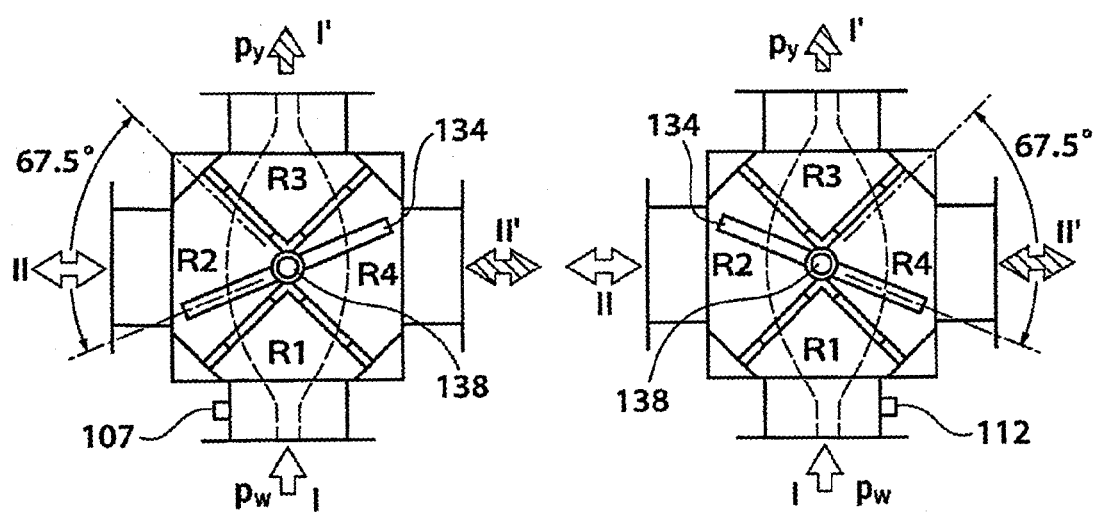
Figure 12:
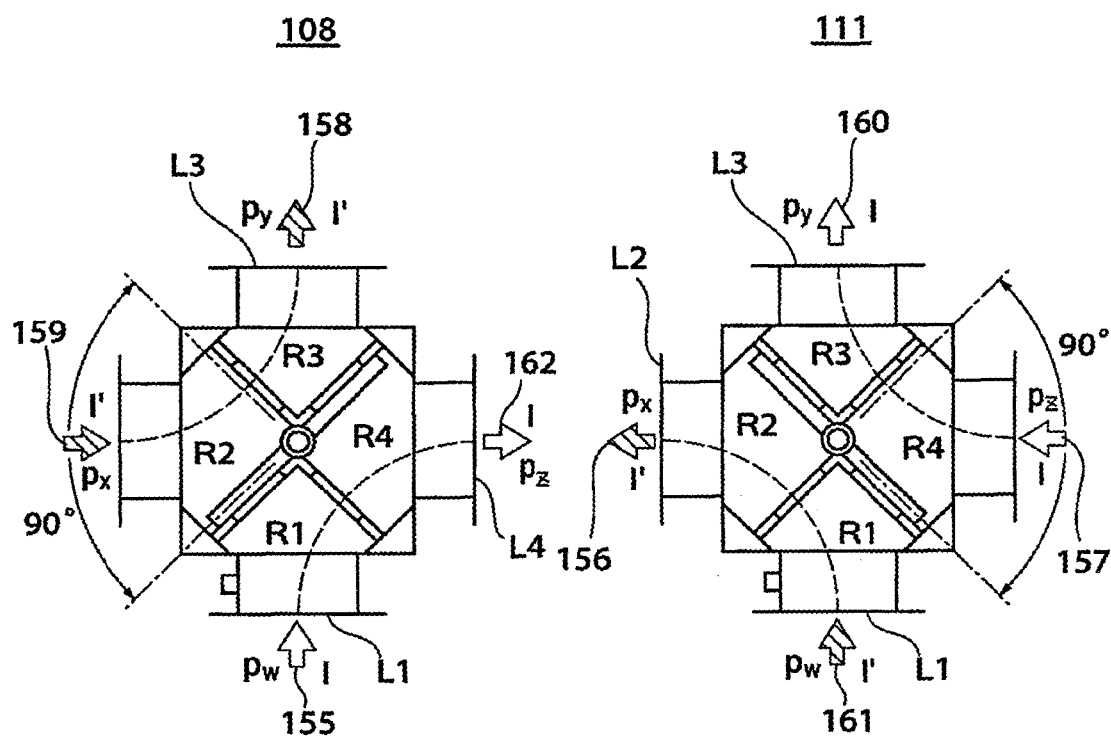
FIG. 12 show diagrams for explaining directions of flows of air (treatment air and regeneration air) in the switching of the adsorption/regeneration modes.

FIG. 9 shows an air cleaning apparatus having a first line and a second line as a first application example of this invention based on batch-type-temperature-swing-adsorption. The first line has a first automatic four-port selector valve (to be also referred to as "first valve" hereinafter) and the second line has a second automatic four-port selector valve (to be also referred to as "second valve" hereinafter). FIGS. 10 to 12 are drawings explaining directions of air in a treatment air duct, a regeneration air duct, a first-line duct, a second-line duct, a supply air duct and an exhaust air duct and directions of air inside each of them, at a time of switching adsorption/regeneration modes in the first and second valves.

The above first valve and second valve are α type valves. Further, the opening portions have the form of a regular square and each opening portion has an area of 85% of the cross-sectional area of the inflow port L1, and each plate-shaped turnable valve body has an area 1.2 times as large as the area of one opening portion. FIGS. 10 to 12 show a case where treatment air is switched from the first line to the second line and regeneration air is switched from the second line to the first line.

In the drawings, the flow of treatment air is indicated by "I", the flow of regeneration air is indicated by "I'", and states where the flows of air in the first valve 108 and the second valve 111 are at stop are indicated by "II" and "II'".

When the treatment air is switched from the second line to the first line and the regeneration air is switched from the first line to the second line, this case will be same as those shown in FIGS. 10 to 12, so that a detailed explanation thereof will be omitted. As described already, the switching of the treatment air or regeneration air from the first line to the second line or from the second line to the first line is referred to as switching of the adsorption/regeneration modes.

In the first valve (valve in the first-line) 108 shown in FIG. 10(A), air 155 flowing out of a treatment air duct flows in through a first-valve dedicated inflow port L1 and flows out of a first-valve inflow/outflow port (1) L2 connected to a first-line duct. On the other hand, air 157 flowing out of a second-line duct flows in through a first-valve inflow/outflow port (2) L4 and flows out of a first-valve outflow port L3. In this case, the plate-shaped turnable valve bodies 134 of the first valve are in the n-position at 0° as shown in FIG. 10(A) and at rest.

In the second valve (valve in the second-line) 111 shown in FIG. 10(A), air 161 flowing out of a regeneration air duct flows in through a second-valve dedicated inflow port L1 and flows out of a second-valve inflow/outflow port (2) L4 connected to a second-line duct. Air 159 flowing out of the first-line duct flows in through a second-valve inflow/outflow port (1) L2 and flows out of a second-valve outflow port L3. In this case, second-valve plate-shaped turnable valve bodies 134 are in the s-position at 0° as shown in FIG. 10(A) and at rest.

In any one of the first valve 108 and the second valve 111 shown in FIGS. 10 to 12, the pressure in the inflow port L1 is represented by Pw, the pressure in the inflow/outflow port L2 is represented by Px, the pressure in the outflow port L3 is represented by Py and the pressure in the inflow/outflow port L4 is represented by Pz.

For changing positions to switch flow passages, then, electric motors 140 as actuating means for the first valve 108 and the second valve 111 are actuated at the same time to turn the first-valve plate-shaped turnable valve bodies 134 counter-clockwise (plus turn) and turn the second-valve plate-shaped turnable valve bodies 134 clockwise (minus turn). FIG. 10(B) shows states where the first-valve plate-shaped turnable valve bodies 134 have turned by +22.5° and the second-valve plate-shaped turnable valve bodies 134 have turned by −22.5° after the actuation of the electric motors for these two valves.

Prior to the switching of the adsorption/regeneration modes, the static pressures of treatment air in the first valve 108 and the second valve 111 are measured with pressure sensors 107 and 112, respectively and adjusted to be equal values, and the flow rates of treatment air and regeneration are adjusted to equal flow rates, as is described above. Thus, the pressure loss that the treatment air has until it reaches the inflow/outflow port (1) L2 of the second valve 111 from the inflow/outflow port (1) L2 of the first valve 108 through the first-line duct 110 and the pressure loss that the regeneration air has until it reaches the inflow/outflow port (2) L4 of the first valve 108 from the inflow/outflow port (2) L4 of the second valve through the second-line duct 117 come to be equal to each other.

When the switching of the adsorption/regeneration modes is started, therefore, upon the spacing or departing of the plate-shaped turnable valve bodies 134 of the first valve and the plate-shaped turnable valve bodies 134 of the second valve from their framed partition plates, the static pressure in the first line between the first valve and the second valve and the static pressure in the second line between the first valve and the second valve come to be equal to each other, and the flow of air flowing in the first-line duct 110 and the flow of air flowing in the second-line duct 117 come to a stop.

And, treatment air immediately flows in through the first-valve inflow port L1 and flows out of the first-valve outflow port L3. On the other hand, regeneration air immediately flows in through the second-valve inflow port L1 and flows out of the second-valve outflow port L3. This mechanism is as explained already with reference to FIGS. 7 and 8.

The above is a phenomenon (advantageous effect) produced in the above switching of the adsorption/regeneration modes when two automatic four-port selector valves of this invention are used in combination, for example, in an air cleaning apparatus based on the batch type temperature swing adsorption, and air can be caused to flow out through the outflow ports L3 of the two valves (first and second valves) in amounts equivalent to those before the switching of the adsorption/regeneration modes. It should be said that this phenomenon is a remarkable effect that could not have been accomplished by the conventional valve (and a selection method using it) that is already discussed with reference to FIG. 6.

That is, in the state shown in FIG. 10(B), the flows in the first-valve inflow/outflow port (1) L2, the first-valve inflow/outflow port (2) L4, the second-valve inflow/outflow port (1) L2 and the second-valve inflow/outflow port (2) L4 come to a stop.

(Turn Angle 45°-67.5°)

FIG. 11(C) shows states where the first-valve plate-shaped turnable valve bodies 134 and the second-valve plate-shaped turnable valve bodies 134 have reached their positions at +45° and −45°, respectively. In these states, the flows of air flowing in the first-line duct 110 and the second-line duct 117 between the first valve 108 and the second valve 111 also keep being at a stop. And the flows of the treatment air and the regeneration air are maintained.

Further, FIG. 11(D) shows states where the first-valve plate-shaped turnable valve bodies 134 and the second-valve plate-shaped turnable valve bodies 134 have reached their positions at +67.5° and −67.5°, respectively. In these states, the flows of air flowing in the first-line duct 110 and the second-line duct 117 between the first valve 108 and the second valve 111 are also in the same states as those in FIG. 11(C). And the flows of the treatment air and the regeneration air are maintained.

(Completion of Change of Adsorption/Regeneration Modes)

FIG. 12(E) shows states where the procedure of switching the adsorption/regeneration modes is completed, that is, states where the plate-shaped turnable valve bodies 134 of the first valve have turned +90° and the plate-shaped turnable valve bodies 134 of the second valve have turned −90° (the first valve has completed a change of n→s and the second valve has completed a change of s→n).

In the first-valve 108 shown in this figure, the air 155 flowing out of the treatment air duct flows in through the first-valve inflow port L1 and flows out of the first-valve inflow/outflow port (2) L4 connected to the second-line duct. On the other hand, the air 159 flowing out of the first-line duct flows in through the first-valve inflow/outflow port (1) L2 and flows out of the first-valve outflow port L3.

In the second valve 111 shown in FIG. 12(E), the air 161 flowing out of the regeneration air duct flows in through the second-valve inflow port L1 and flows out of the second-valve inflow/outflow port (1) L2 connected to the first-line duct. On the other hand, the air 157 flowing out of the second-line duct flows in through the second-valve inflow/outflow port (2) L4 and flows out of the second-valve outflow port L3.

In the states of FIG. 12(E), the static pressures and flow rates of the treatment air and regeneration air are maintained in the same states as those of FIG. 10(A).

On the other hand, the first-valve plate-shaped turnable valve bodies 134 turn +90°, and the second-valve plate-shaped turnable valve bodies 134 turn −90°, to come to a stop.

The time period taken from the start to the completion of the procedure of switching the adsorption/regeneration modes cannot be uniformly determined since it differs depending upon tolerant accuracies of a variation in pressure and a variation in flow rate. During the switching of the adsorption/regeneration modes, however, the air that flows from the outflow port 3 of the first valve to the exhaust air duct is treatment air, and the air that flows from the outflow port L3 of the second valve to the supply air duct is regeneration air, so that the smaller the above time period is, the more preferred it is. The above time period is generally in the range of 0.1 to 20 seconds, preferably 0.1 to 10 seconds, more preferably 0.1 to 5 seconds, the most preferably 0.1 to 1 second.

From the viewpoint of a design and production, the angle at which the framed partition plates 132b and 132c cross each other or the framed 132d and 132a cross each other in the α type is preferably in the range of 60° to 120°. When the above angle is less than 60°, it is difficult to attach the ports. Thus, the turn angle of the plate-shaped turnable valve bodies 134 is 120° to 60°, and when a pressing angle of 2° for bringing the plate-shaped turnable valve bodies 134 into tight contact with the framed valve sheets 133 is taken into account, the turn angle is actually 62° to 122°.

Further, as shown in FIG. 10(B), FIG. 11(C) and FIG. 11(D), the positional relationship of the plate-shaped turnable valve bodies 134a and 134b and the opening portions 139a to 139d in the α type in the state of the plate-shaped turnable valve bodies 134a and 134b being spaced departed from the framed partition plates 132a to 132d is that the opening ratio thereof to the air 155 flowing out of the treatment air duct in the first valve 108 and the opening ratio thereof to the air 161 flowing out of the regeneration air duct in the second valve 111 cannot be 100% in any instance. That is, there is produced a desirable baffle effect that the plate-shaped turnable valve bodies 134a and 134b constitute baffles that increase a pressure loss against the air 155 flowing out of the treatment air duct and the air 161 flowing out of the regeneration air duct, and the baffle effect increases the pressure loss of the air 155 flowing out of the treatment air duct, and passing through the first valve 108. Further, it also increases the pressure loss of the air 161 flowing out of the regeneration air duct, passing through the second valve 111.

(Pressure Variation During Steady State Operation and at the Time of Switching Adsorption/Regeneration Modes)

For a time period for which the plate-shaped turnable valve bodies 134 of the first valve 108 are in the n-position, the plate-shaped turnable valve bodies 134 of the second valve 111 are in the s-position, the first line performs the adsorption operation and the second line performs the regeneration operation, the treatment air shown in FIG. 9 flows in through the inflow port L1 of the first valve 108, passes through the inflow/outflow port (1) L2 of the first valve 108, flows into the first-line duct 110, passes through the first-line adsorbent units 109, flows in through the inflow/outflow port (1) L2 of the second valve 111 and flows out through the outflow port L3 of the second valve 111. The pressure loss ΔP1 in this time period is a difference between a pressure Pw1 in the first-valve inflow port L1 and a pressure Py2 in the second-valve outflow port L3, i.e., ΔP1=Pw1−Py2.

As explained already, for switching the adsorption/regeneration modes, the pressure in the inflow port L1 of the first valve, i.e., the pressure Pw1 of the treatment air and the pressure in the inflow port L1 of the second valve, i.e., the pressure Pw2 of the regeneration air are adjusted with the above static pressure measuring/adjusting means so that they are equal to each other, before the above switching of the adsorption/regeneration modes. In the switching of the adsorption/regeneration modes, therefore, the pressure loss ΔP2 between the inflow port L1 of the second valve 111 and the outflow port L3 of the second valve 111 is a difference between the pressure Pw2 in the inflow port L1 of the second valve 111 and the pressure Py2 in the outflow port L3 of the second valve 111 in the switching of the adsorption/regeneration modes; ΔP2=Pw2−Py2=Pw1−Py2. Further, the flow rate of the treatment air and the flow rate of the regeneration air are adjusted to be equal values with flow rate measuring/adjusting means.

Naturally, since ΔP1>ΔP2, Py1<Py2. That is, generally, the switching of the adsorption/regeneration modes causes a variation in pressure difference, i.e., a very undesirable variation in which the pressure in the outflow port L3 of the second valve 111 increases.

However, in the apparatus shown in FIG. 9, which uses the two automatic four-port selector valves of this invention in combination, the pressure loss in the flow passing through the first-line adsorbent units 109a and 109b is small as compared with those in Application Example 2 shown in FIG. 13 and Application Example 3 shown in FIG. 14 which will be described later. In addition thereto, due to the baffle effect produced by the plate-shaped turnable valve bodies 134 of the second valve 111 when they turn as described above, Py2≈Py1, so that the range of the variation in pressure difference can be controlled to be within tolerant accuracies although Py2 becomes large.

When the β type is used as the second valve 111, Py2 is slightly larger than that found when the above α type is used. In the switching of the adsorption/regeneration modes, further, a variation in pressure different takes place in the flow of the exhaust air in the outflow port L3 of the first valve 108 simultaneously with the variation in pressure difference in the outflow port L3 of the second valve 111, while the range of the variation in the pressure difference can be suppressed by the baffle effect produced by the plate-shaped turnable valve bodies 134 of the above valve, thereby controlling it to be within tolerant accuracies.

(Function of Movable Plates in Dry Air Supply Apparatus)

Figure 13:
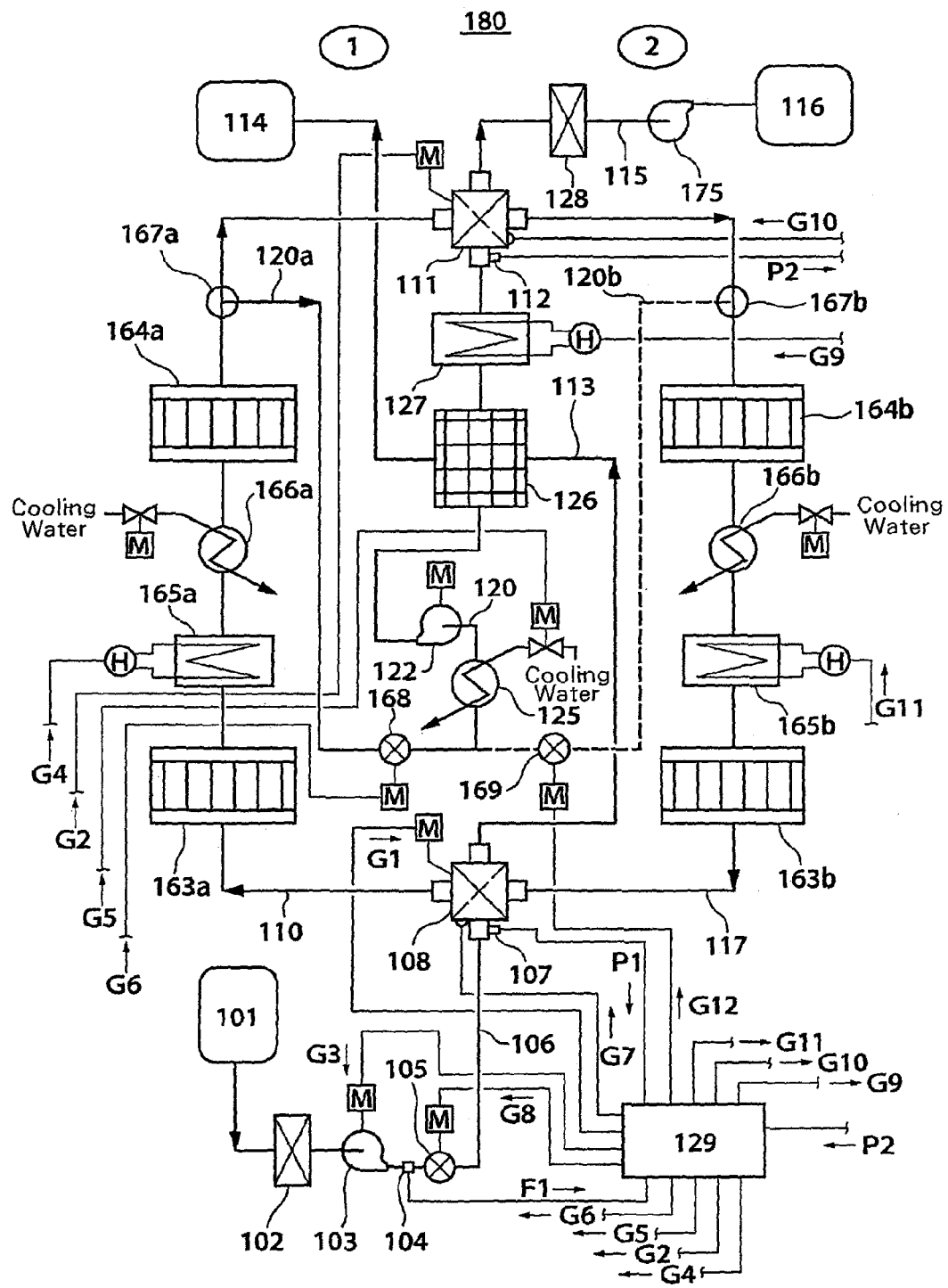
FIG. 13 is a diagram or flow-sheet for explaining a dry air supply apparatus 180 provided with two automatic four-port selector valves of this invention based on batch type temperature swing adsorption.

FIG. 13 shows a dry air supply apparatus 180 based on batch-type-temperature-swing-adsorption having two automatic four-port selector valves of this invention, and there will be shown the function of movable plates for pressure adjustment which are applied to the above apparatus.

To the first-line duct 110 are connected a first-line No. 1 dehumidification unit 163a, a first-line heater 165a, a first-line cooler 166a, a first-line No. 2 dehumidification unit 164a and a first-line divider 167a, and to the second-line duct 117 are connected a second-line No. 1 dehumidification unit 163b, a second-line heater 165b, a second-line cooler 166b, a second-line No. 2 dehumidification unit 164b and a second-line divider 167b.

The treatment air shown in FIG. 13 flows in the inflow port L1 of the first valve 108, passes through the inflow/outflow port (1) L2 of the first valve 108, flows the adsorption/regeneration modes and that after the switching of the adsorption/regeneration modes are equal to each other, or ΔP2=Pw2−Py2=Pw1−Py2. In the above manner, the variation in pressure difference in the switching of the adsorption/regeneration modes can be controlled within tolerant accuracies. Further, by the time of completion of the switching of the adsorption/regeneration modes, the movable plates 150a and 150c are moved to 0% positions, respectively, synchronously with the turn of the plate-shaped turnable valve bodies 134 so that the opening areas of the opening portions 139a and 139c come to be 100%.

If the adsorption/regeneration modes should be switched while the opening portions 139a and 139c have an opening area of 100% without moving the movable plates 150a and 150c before the switching of the adsorption/regeneration modes, since ΔP1>ΔP2, Py1<Py2, which results in the occurrence of a variation in pressure difference, i.e., a variation in which the pressure in the outflow port L3 of the second valve 111 increases, as is extremely undesirable.

In the switching of the adsorption/regeneration modes, further, a variation in pressure difference takes place also in the flow of exhaust air in the outflow port L3 of the first valve 108 simultaneously with the variation in pressure difference in the outflow port L3 of the second valve 111. For suppressing this variation, the pressure difference is adjusted by moving the movable plates 150b and 150d before the switching of the adsorption/regeneration modes. Further, by the time of completion of the switching of the adsorption/regeneration modes, the movable plates 150b and 150d are moved to 0% positions, respectively, synchronously with the turn of the plate-shaped turnable valve bodies 134 so that the opening areas of the opening portions 139b and 139d come to be 100%.

(Clean Controlled-Temperature/Controlled-Humidity Air Supply Apparatus)

Figure 14:
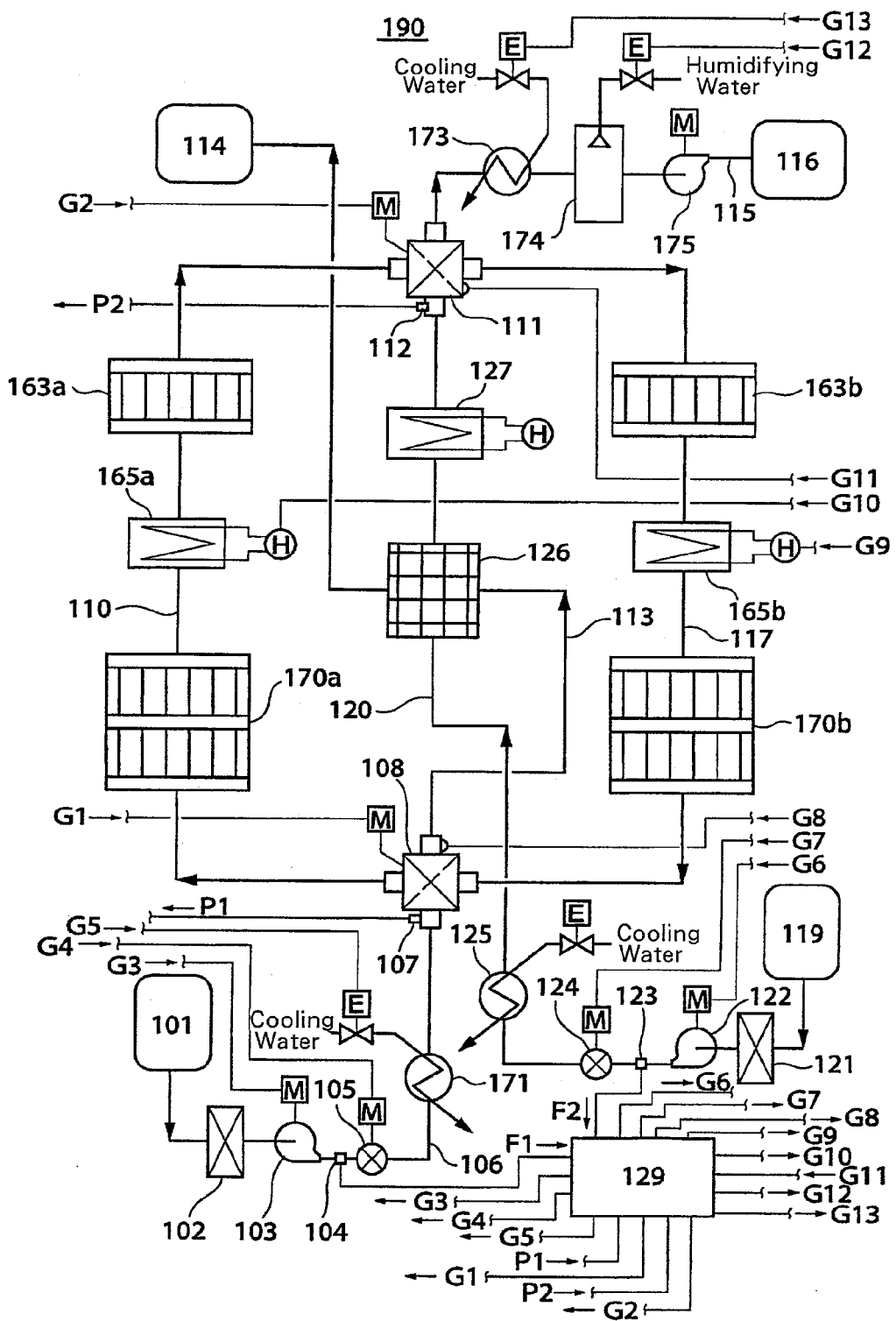
FIG. 14 is a diagram for explaining a clean temperature-controlled/humidity-controlled air supply apparatus 190 provided with two automatic four-port selector valves of this invention based on batch type temperature swing adsorption.

FIG. 14 shows a clean temperature-controlled/humidity-controlled air supply apparatus. The variation in pressure difference in this clean temperature-controlled/humidity-controlled air supply apparatus 190 can be controlled within the tolerant accuracy in the same manner as in the above dry air supply apparatus shown in FIG. 13. As explained in detail hereinabove, the automatic four-port selector valve of this invention preferably has the movable plates 150 for pressure adjustment and an actuator thereof (actuating means) 151 shown in FIGS. 1-2 and FIGS. 4-5 and is hence provided with means capable of changing the opening ratios of the opening portions, so that it can be said that the automatic four-port selector valve of this invention is a remarkable selector valve having novel features that no conventional valve can have or the features that before the switching is undertaken, the opening ratios can be set at predetermined values without disturbing flowing states at that time and that the variation in static pressure, the variation in pressure difference and the variation in flow rate can be controlled to be within tolerant accuracies.

Application Example 1

Application to Air Cleaning Apparatus

FIG. 9 shows an example in which the automatic four-port selector valve of this invention is applied to an air cleaning apparatus 130 comprising a first line and a second line, and two automatic four-port selector valves of this invention are applied as a valve in the first line (which will be referred to as "first valve" 108) and a valve of the second line (which will be referred to as "second valve" 111).

The inflow port L1 of the above first valve 108 is connected to a treatment air duct 106, the inflow/outflow port (1) L2 thereof is connected to a first-line duct 110, the inflow/outflow port (2) L4 thereof is connected to a second-line duct 117 and the outflow port L3 thereof is connected to an exhaust air duct 113.

Further, the inflow port L1 of the second valve 111 is connected to a regeneration air duct 120, the inflow/outflow port (1) L2 thereof is connected to a first-line duct 110, the inflow/outflow port (2) L4 thereof is connected to a second-line duct 117 and the outflow port L3 thereof is connected to a supply air duct 115.

Further, in the treatment air duct 106 are arranged a treatment air inlet 101, a treatment air filter 102, a treatment air blower 103, a treatment air flow rate sensor 104 and a treatment air damper 105.

Further, the first-line duct 110 is provided with first-line adsorbent units 109a and 109b. The first-line adsorbent unit 109a is a vessel containing a honeycomb-shaped, pleated or corrugated adsorbent capable of selectively adsorbing and removing basic molecular contaminants and the first-line adsorbent unit 109b is a vessel containing a honeycomb-shaped, pleated or corrugated adsorbent capable of selectively adsorbing and removing acidic and/or organic molecular contaminants. The material for selectively adsorbing basic contaminants can be selected from a two-component composite oxide comprising titanium and silicon, a two-component composite oxide comprising titanium and zirconium, a three-component composite oxide comprising titanium, silicon and zirconium, or the like. The material for selectively adsorbing organic substances and/or acidic substances can be selected from activated carbon, activated coke, graphite carbon, activated carbon fibers, zeolite, silica gel or the like.

The second-line duct 117 is provided with second-line adsorbent units 118a and 118b. The second-line adsorbent units 118a and 118b have the same constitutions as those of the first line.

The air cleaning apparatus 130 in FIG. 9 does not necessarily require the movable plates for pressure adjustment and their actuators for a reason already discussed, and two automatic four-port selector valves having none of them were used. Both of these valves are of the α type.

(Regeneration Air, Supply Air, Exhaust Air and Treatment Air)

The regeneration air duct 120 related to regeneration air is provided with a regeneration air inlet 119, a regeneration air filter 121, a regeneration air blower 122, a regeneration air sensor 123, a regeneration air damper 124, a regeneration air cooler 125 and a regeneration air heater 127 to constitute regeneration means.

The supply air duct 115 related to supply air is provided with a supply filter 128 and a supply air outlet 116, and the exhaust air duct 113 related to exhaust air is provided with an exhaust air outlet 114. A switching controller 129 is provided for automatically performing the switching the adsorption/regeneration modes and controlling variations in pressure and flow rate within tolerant accuracies.

As shown in FIG. 9, the treatment air flows into the air cleaning apparatus 130 from the treatment air inlet 101, through the first valve 108 and in the first-line duct 110 and passes through the second valve 111 to be supplied through the supply air outlet 116.

The regeneration air flows into the air cleaning apparatus 130 from the regeneration air inlet 119, is adjusted to predetermined flow rate and temperature, flows through the second valve 111 and in the second-line duct 117 and passes through the first valve 108 to be exhausted through the exhaust air outlet 114.

Figure 6:
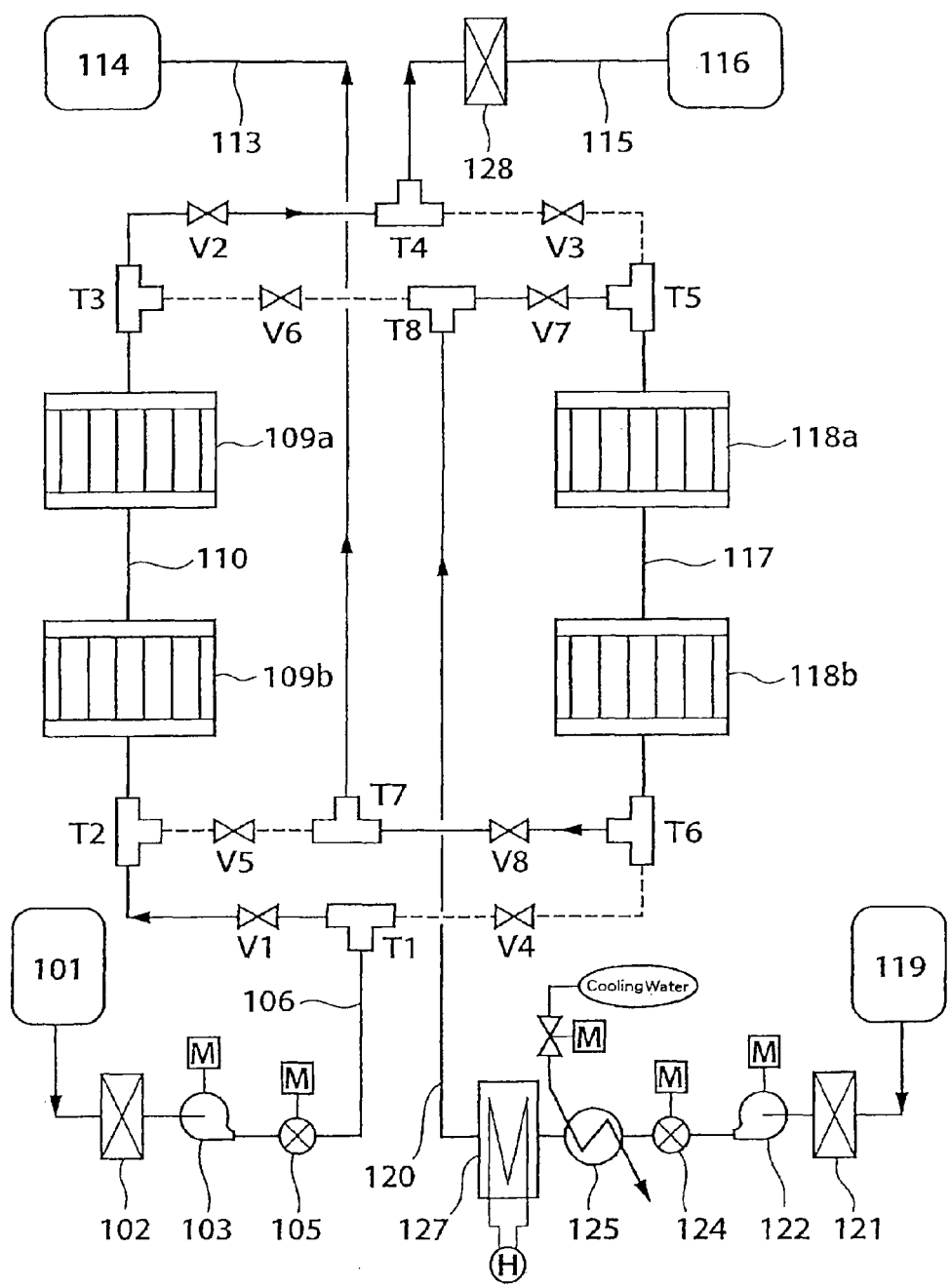
FIG. 6 is a diagram or flow-sheet for explaining a conventional air cleaning apparatus 200 based on batch type temperature swing adsorption.

As is clear in FIG. 9, according to the constitution of the present invention in which the air cleaning apparatus uses the two automatic four-port selector valves of this invention, all of the eight on-off valves and the eight branching/confluent points essential in the conventional air cleaning apparatus shown in FIG. 6 can be eliminated. Further, it is no longer necessary to use the two duct lines that are required for each upstream and downstream of the adsorbent units in the conventional apparatus shown in FIG. 6.

(Steady State Operation)

FIG. 9 shows adsorption/regeneration modes in which the first line is in the adsorption operation and the second line is in the regeneration operation as steady operations, and hence treatment air flowing into the first-line duct 110 from the first valve 108 passes through the first-line adsorbent units 109b and 109a, during which molecular contaminants are removed by adsorption to a predetermined concentration to clean the treatment air.

Regeneration air flowing into the second line duct 117 from the second valve 111 is heated to a predetermined temperature with the regeneration air heater 127 and passes through the second-line adsorbent units 118a and 118b in the desorption operation, during which the regeneration air desorbs a desorbed molecular contaminants, and the regeneration air flows into the exhaust air duct 113 from the first valve 108 to be exhausted from the exhaust air outlet 114.

For this period, the regeneration air cooler 125 is at rest or not in operation. In a subsequent cooling operation, regeneration air is cooled to a predetermined temperature with the regeneration air cooler 125 and passes through the adsorbent units 118a and 118b, during which the regeneration air cools the adsorbents heated in the desorption operation to a temperature around that of the regeneration air.

The side plate, top plate, and bottom plate, constituting the casing bodies of the first valve 108 framed partition plates, turn shaft and plate-shaped turnable valve bodies and the second valve 111 are preferably provided with heat-insulating functions, so that the transfer of heat between the treatment air (supply air) and the regeneration air is suppressed.

(Switching of Adsorption/Regeneration Modes)

The switching of the adsorption/regeneration modes in FIG. 9 refers to procedures of switching the treatment air from the first line to flow in the second line and switching the regeneration air from the second line to flow in the first line, and the switching is the automatic procedure wherein operation of the first valve 108 and the second valve 111 with output signals from the switching controller simultaneously at a set time is made for a short period of time.

On the other hand, prior to the switching, the flow rate and pressure of the treatment air and the flow rate and pressure of the regeneration air are automatically adjusted as follows with the measuring/adjusting means of the treatment air flow rate sensor 104, the first-valve pressure sensor 107, the regeneration air flow rate sensor 123, the second-valve pressure sensor 112, the treatment air blower 103, the treatment air damper 105, the regeneration air blower 122 and the regeneration air damper 124 and the switching controller 129.

When the flow rate and pressure of the treatment air and the flow rate and pressure of the regeneration air are adjusted, a measurement value F1 of the flow rate measured with the treatment air flow rate sensor 104 and a measurement value F2 of the flow rate measured with the regeneration air flow rate sensor 123 are inputted to the switching controller 129, and a measurement value P1 of the pressure measured with the first-valve pressure sensor 107 and a measurement value P2 of the pressure measured with the second-valve pressure sensor 112 are inputted to the switching controller 129.

Operation processing is performed on the basis of these measurement values, and the switching controller 129 outputs a control signal G4 to the treatment air blower 103 and outputs a control signal G3 to the treatment air damper 105. Further, the switching controller 129 outputs a control signal G7 to the regeneration air blower 122 and outputs a control signal G6 to the regeneration air damper 124.

After completion of the adjustment of the flow rate and pressure of the treatment air and the flow rate and pressure of the regeneration air, the switching controller 129 simultaneously outputs control signals G1 and G2 for driving to the electric motor of the first valve 108 and the electric motor of the second valve 111. And, the plate-shaped turnable valve bodies of the first valve 108 is actuated counterclockwise, and the plate-shaped turnable valve bodies of the second valve 111 is actuated clockwise, simultaneously, and they turn 90° for 0.75 second and stop simultaneously to complete the switching of the adsorption/regeneration modes.

For the above switching time period of 0.75 second, both the flow variation and the pressure variation are controlled within 5% or less.

By the above switching, the regeneration air comes to flow in the first line and the treatment air comes to flow in the second line. And, there are not caused any "standing" or "stagnant" places where treatment gas or regeneration gas stays without flowing.

Since it is clear that the switching of the adsorption/regeneration modes to switch the treatment air from the second line to the first line and switching the regeneration air from the first line to the second line is performed in the same manner as the above-described, a detailed explanation thereof will be omitted.

Application Example 2

Application to Dry Air Supply Apparatus Based on Batch Type Temperature Swing Adsorption FIG. 13 shows an example in which the automatic four-port selector valve of this invention is applied to a dry air supply apparatus 180 comprising a first line and a second line and based on the batch type temperature swing adsorption, and it is a diagram for explaining the dry air supply apparatus having two automatic four-port selector valves as a first-line valve (first valve 108) and a second line valve (second valve 111).

(Treatment Air, Exhaust Air, Regeneration Air and Supply Air)

The inflow port L1 of the first valve 108 is connected to a treatment air duct 106, the inflow/outflow port (1) L2 thereof connected to a first-line duct 110, the inflow/outflow port (2) L4 thereof is connected to a second-line duct 117 and the outflow port L3 thereof is connected to an exhaust air duct 113.

Further, the inflow port L1 of the second valve 111 is connected to a regeneration duct 120, the inflow/outflow port (1) L2 thereof is connected to a first-line duct 110, the inflow/outflow port (2) L4 thereof is connected to a second-line duct 117 and the outflow port L3 thereof is connected to a supply air duct 115.

The dry air supply apparatus 180 shown in FIG. 13 used two automatic four-port selector valves provided each with the movable plates and its actuator. Both of the valves were of the α type.

In the treatment air duct 106 are arranged a treatment air inlet 101, a treatment air filter 102, a treatment air blower 103, a treatment air flow rate sensor 104 and a treatment air damper 105.

Further, in the first-line duct 110 are arranged a first-line No. 1 dehumidification unit 163a, a first-line No. 2 dehumidification unit 164a, a first-line heater 165a, a first-line cooler 166a and a first-line divider 167a, and the second-line duct 117 is also provided with the same units or equipment as those arranged in the first line.

Each dehumidification unit is a vessel or container encasing a honeycomb-shaped, pleated or corrugated adsorbent capable of removing water vapor in the air by adsorption. This adsorbent can be selected from zeolite, silica gel, alumina or the like. Ducts are branched such that regeneration air is taken in from the first-line duct 110 and the second-line duct 117. That is, the first-line duct 110 and the first-line regeneration air duct 120a are branched in the first-line divider (branching point) 167a arranged downstream of the first-line No. 2 dehumidification unit 164a. A first on-off valve 168 is arranged in the first-line regeneration air duct 120a.

Similarly, the second-line duct 117 and the second-line regeneration air duct 120b are branched at the second-line divider (branching point) 167b arranged downstream of the second-line No. 2 dehumidification unit 164b. A second on-off valve 169 is arranged in the second-line regeneration air duct 120b.

Then, the first-line regeneration air duct 120a and the second-line regeneration air duct 120b are caused to join each other to be provided with the regeneration air duct 120. In the regeneration air duct 120 are arranged a regeneration air cooler 125, a regeneration air blower 122, a regeneration air pre-heater 126 and a regeneration air heater 127.

In the supply air duct 115 are arranged a supply air filter 128, a supply air blower 175 and a supply air outlet 116, and in the exhaust air duct 113 is arranged an exhaust air outlet 114.

The dry air supply apparatus 180 having two automatic four-port selector valves of this invention is provided with a switching controller 129 for performing automatic switching of adsorption/regeneration modes and for controlling variations in pressure difference, in addition to pressure and flow rate, within tolerant accuracies.

(Treatment Air)

As shown in FIG. 13, treatment air is caused to flow in the dry air supply apparatus 180 from the treatment air inlet 101, caused to flow in the first-line duct 110 through the first valve 108, caused to pass through the first-line No. 1 dehumidification unit 163a, the first-line cooler 166a and the first-line No. 2 dehumidification unit 164a and divided through the first-line divider 167a into two portions to cause them to flow in the first-line duct 110 and the first-line regeneration air duct 120a at equal rates. While the treatment air passes through both the dehumidification units 163a and 164a, water vapor is removed until the treatment air comes to have a predetermined dew point, e.g., its humidity at −100° C., and it flows further in the first-line duct 110 and passes through the second valve 111 to become supply air. The above supply air is supplied to a subsequent apparatus through the supply air outlet 116. In addition, a supply air blower 175 is provided as required. When it is to be provided, it is preferred to select an airtight machine that sucks no external air.

(Regeneration Air)

FIG. 13 shows a state where the first line is in adsorption operation and the second line is in regeneration operation.

As shown in FIG. 13, the regeneration air flows in the first-line regeneration air duct 120a from the first-line divider 167a, flows down through the first on-off valve in a valve-opened state, flows into the regeneration air duct 120 through a confluent point with the second-line regeneration air duct 120b, passes through the regeneration air cooler 125, the regeneration air blower 122, the regeneration air pre-heater 126 and the regeneration air heater 127 and flows into the second-line duct 117 through the second valve 111.

In FIG. 13, the regeneration air passes through the second-line divider 167b, flows down in the order of the second-line No. 2 dehumidification unit 164b, the second-line cooler 166b, the second-line heater 165b and the second-line No. 1 dehumidification unit 163b and flows into the first valve 108. It flows into the exhaust air duct 113 from the first valve 108 and passes through the exhaust air pre-heater 126 to be exhausted out of the line through the exhaust air outlet 114. In this case, since the second on-off valve 169 is in a valve-closed state, no regeneration air flows in the second-line regeneration air duct 120b. FIG. 13 uses a dotted line to show this state.

FIG. 13 shows the state of adsorption/regeneration modes in which the first line is in adsorption operation and the second line is in regeneration operation, so that the first-line heater 165a is stopped from heating and that the first-line cooler 166a is working for cooling. When the regeneration operation performed in the second line is desorption operation, the regeneration air heater 127 is in operation, the second-line cooler 166b is stopped from cooling and the second-line heater 165b is working for heating.

Further, when the regeneration operation performed in the second line is cooling operation, the regeneration air cooler 125 and the second-line cooler 166b are in operation, but the regeneration air heater 127 and the second-line heater 165 are stopped from working.

In FIG. 13, since the treatment air (supply air) and the regeneration air that flow in the first valve 108 and the second valve 111 also have considerably different temperatures, usually the transfer of heat can take place. In the automatic four-port selector valve of this invention, however, the side plate, top plate, bottom plate, framed partition plates, turn shaft and plate-shaped turnable valve bodies of the valves are preferably constituted to have heat-insulating functions, thereby that the transfer of heat between the treatment air (supply air) and the regeneration air is substantially suppressed.

(Switching of Adsorption/Regeneration Modes)

The switching of the adsorption/regeneration modes in FIG. 13 refers to procedures of switching the flow of the treatment air from the first line to the second line and switching the flow of the regeneration air from the second line to the first line, and the switching is the automatic procedure wherein operation of the first valve 108 and the second valve 111 at a set time is made for a short period of time simultaneously with output signals from the switching controller 129.

On the other hand, when the adsorption/regeneration modes of performing the adsorption operation in the first line and performing the regeneration operation in the second line are switched to the adsorption/regeneration modes of performing the regeneration operation in the first line and performing the adsorption operation in the second line, the flow rate and pressure of the treatment air and the flow rate and pressure of the regeneration air are automatically adjusted, prior to the switching procedure, in the following manner with measuring and adjusting means of the treatment air flow rate sensor 104, the first-valve pressure sensor 107, the second-valve pressure sensor 112, the treatment air blower 103 and the treatment air damper 105 and the switching controller 129.

That is, for adjusting the flow rate and pressure of the treatment air and the flow rate and pressure of the regeneration air, a measurement value F1 of the flow rate measured with the treatment air flow rate sensor 104 and a measurement value F2 (not shown) of the flow rate measured with the regeneration air flow rate sensor 123 (not shown) are inputted to the switching controller 129, and a measurement value P1 of the pressure measured with the first-valve pressure sensor 107 and a measurement value P2 of the pressure measured with the second-valve pressure sensor 112 are inputted to the switching controller 129.

Operation processing is performed on the basis of these measurement values, and the switching controller 129 outputs a control signal G3 to the treatment air blower 103 and outputs a control signal G8 to the treatment air damper 105.

Then, the pressure difference between the inflow port L1 of the first valve and the outflow port L3 thereof is adjusted by moving the pressure-adjustment movable plates 150b and 150d of the first valve of which the plate-shaped turnable valve bodies 134 are in the n-position to predetermined positions on the basis of an output signal G7 from the switching controller 129. Further, the pressure difference between the inflow port L1 of the second valve and the outflow port L3 thereof is adjusted by moving the movable plates 150a' and 150c' of the second valve of which the plate-shaped turnable valve bodies 134 are in the s-position on the basis of an output signal G10 from the switching controller 129. Then, the first valve 108 and the second valve 111 are simultaneously operated by means of the switching controller 129 for a short period of time to switch the treatment air from the first line to the second line and switch the regeneration air from the second line to the first line, so that the flow rate variation, pressure variation and pressure difference variation of the supply air can be controlled so that they are within 5%. The variations within 5% are variation accuracies in normal operations and these variations of the supply air are considered to cause no problem on the operation in a subsequent step.

The switching of the treatment air from the second line to the first line and switching of the regeneration air from the first line to the second line can be performed in the same manner as the above-described.

(Function and Advantageous Effect)

When the regeneration air has performed the desorption-regeneration of the adsorbents of the second-line No. 2 dehumidification unit 164b and the second-line No. 1 dehumidification unit 163b and flowed in the first valve 108, the regeneration air generally has a temperature of 50° C. or higher. Thus, the above regeneration air flows in the exhaust air duct 113 and passes through the regeneration air pre-heater 126, whereby the above regeneration air performs heat-exchange with regeneration air that has an ordinary temperature and flows from the air regeneration duct 120 into the air pre-heater 126, thereby the pre-heating can be carried out for increasing the temperature of the latter regeneration air. Meanwhile, the heat recovery is carried out by decreasing the temperature of the regeneration air to be exhausted. When the above regeneration air pre-heater 126 is provided, thus, a heating amount in the regeneration air heater 127 can be reduced, thereby contributing to energy saving.

In the dry air supply apparatus 180 provided with the two automatic four-port selector valves of this invention based on the batch type temperature swing adsorption, the air that has passed through the first-line No. 2 dehumidification unit 164a is divided into two portions, and the water vapor concentration (absolute humidity) of the air that flows from the first-line duct 110 into the second valve 111 to become supply air and the water vapor concentration (absolute humidity) of the regeneration air that flows into the second valve 111 in the switching are hence equal to each other, so that no variation in the water concentration takes place in the switching of the adsorption/regeneration modes. Further, the air staying in the second-line regeneration air duct 120b in FIG. 13 has a water vapor concentration (absolute humidity) also equal to that of the supply air, so that no variation in the water vapor concentration takes place in the switching of the adsorption/regeneration modes.

Further, the air that has passed through the first-line No. 2 dehumidification unit 164a is heated as regeneration air and then passed through the second-line No. 2 dehumidification unit 164b and the No. 1 dehumidification unit 163b for the desorption. Thus, thorough desorption/regeneration can be performed, the water vapor concentration in the dry air as supply air is stable and air having a dew point of −80° C. or lower can be constantly supplied.

Application Example 3

Application to Clean Humidity-Controlled/Temperature-Controlled Air Supply Apparatus Based on Batch Type Temperature Swing Adsorption FIG. 14 an example in which the automatic four-port selector valve of this invention is applied to a clean humidity-controlled/temperature-controlled air supply apparatus 190 comprising a first line and a second line based on the batch type temperature swing adsorption, and two valves of such are applied as a first-line valve (to be referred to as "first valve 108") and a second line valve (to be referred to as "second valve 111").

The inflow port L1 of the first valve is connected to a treatment air duct 106, the inflow/outflow port (1) L2 thereof is connected to a first-line duct 110, the inflow/outflow port (2) L4 thereof is connected to a second-line duct 117 and the outflow port L3 thereof is connected to an exhaust air duct 113.

Further, the inflow port L1 of the second valve is connected to a regeneration duct 120, the inflow/outflow port (1) L2 thereof is connected to a first-line duct 110, the inflow/outflow port (2) L4 thereof is connected to a second-line duct 117 and the outflow port L3 thereof is connected to a supply air duct 115.

As the first valve 108 and the second valve 111 in the clean humidity-controlled/temperature-controlled air supply apparatus 190 shown in FIG. 14, automatic four-port selector valves having movable plates and their actuators each were used. They were all of the α type.

(Regeneration Air, Supply Air, Treatment Air, Regeneration Air)

In the first-line duct 111 are arranged a first-line cleaning unit 170a, a first-line No. 1 dehumidification unit 163a and a first-line heater 165a.

In the regeneration air duct 120 are arranged a regeneration air inlet 119, a regeneration air filter 121, a regeneration air blower 122, a regeneration air flow rate sensor 123, a regeneration air damper 124, a regeneration air cooler 125, a regeneration air pre-heater 126a, and regeneration air heater 127, to constitute regeneration means.

In the supply air duct 115 are arrange a supply air cooler 173, a supply air humidifier 174, a supply air blower 175 and a supply air outlet 116, and in the exhaust air duct 113 are arranged a regeneration air pre-heater 126 and an exhaust air outlet 114.

Further, the clean humidity-controlled/temperature-controlled air supply apparatus 190 having the two automatic four-port selector valves of this invention is provided with a switching controller 129 for automatically performing the switching of adsorption/regeneration modes and controlling a variation in pressure difference in addition to variations in pressure and flow rate within tolerant accuracies.

In FIG. 14, treatment air is caused to flow into the clean humidity-controlled/temperature-controlled air supply apparatus 190 from the treatment air inlet 101, caused to flow down through the first valve 108 to the first-line duct 110 and caused to flow to the first-line No. 1 dehumidification unit 163a through the first-line cleaning unit 170a and the first-line heater 165a. While the treatment air passes through the above cleaning unit 170a, molecular contaminants are removed to a predetermined concentration, and while it passes through the above dehumidification unit 163a, water vapor is removed to such an extent that it has a humidity lower than a humidity at a predetermined dew point. The treatment air passes through the second valve 111 and is temperature-adjusted in the supply air cooler 173, humidity-adjusted in the supply air humidifier 174, pressure-increased in the supply air blower 175 and then supplied as supply air through the supply air outlet 116.

The cleaning units 170a and 170b used in the clean humidity-controlled/temperature-controlled air supply apparatus 190 shown in FIG. 14 are vessels or containers each encasing a honeycomb-shaped adsorbent like the cleaning units 109 and 118 used in FIGS. 6 and 9. Further, the dehumidification unit 163 is a vessel or container encasing a honeycomb-shaped dehumidifying adsorbent like the No. 1 dehumidification units 163a and 163b used in the dry air supply apparatus 180 shown in FIG. 13.

Regeneration air flows into the clean humidity-controlled/temperature-controlled air supply apparatus 190 through the regeneration air inlet 119, is adjusted to a predetermined flow rate and a predetermined temperature, flows in the second valve 111 and then the second-line duct 117 and passes through the first valve 108 to be exhausted through the exhaust air outlet 114.

In FIG. 14, the first line is in adsorption operation and the second line is in regeneration operation, so that the first-line heater 165a is stopped from heating. When the regeneration operation in the second line is desorption operation, both the regeneration air heater 127 and the second-line heater 165b are working for heating. Further, when the regeneration operation in the second line is cooling operation, the regeneration air cooler 125 is in operation while both the regeneration heater 127 and the second-line heater 165b are stopped.

In the apparatus shown in FIG. 14, further, since the treatment air (supply air) and the regeneration air (exhaust air) that flow in the first valve 108 and the second valve 111 also have considerably different temperatures like those cases already discussed, the transfer of heat can take place.

In the automatic four-port selector valve of this invention, however, the side plate, top plate, and bottom plate, constituting the casing bodies, framed partition plates, turn shaft and plate-shaped turnable valve bodies of the valves are preferably constituted to have heat-insulating functions, so that the transfer of heat between the treatment air (supply air) and the regeneration air (exhaust air) is substantially suppressed.

Further, the plate-shaped turnable valve bodies 134 (FIG. 3) of the first valve 108 and the second valve 111 are in tight contact with the framed valve seats 133 (see FIG. 3) through a gaskets embedded in two gasket grooves 154 formed in each framed valve seat 133, so that no leak from a high pressure side to a low pressure side takes place even if the treatment air (supply air) and the regeneration air (exhaust air) have different pressures. Further, the transfer of heat between the plate-shaped turnable valve bodies 134 and the framed partition plates 132 is very small.

(Switching of Adsorption/Regeneration Modes)

The switching of the adsorption/regeneration modes refers to procedures of switching the flow of the treatment air from the first line to the second line and switching the flow of the regeneration air from the second line to the first line in FIG. 14, and the switching is the automatic procedure wherein operation of the first valve 108 and the second valve 111 at a set time is made with output signals from the switching controller 129 simultaneously for a short period of time.

Meanwhile, prior to the switching, the flow rate and pressure of the treatment air and the flow rate and pressure of the regeneration air are automatically adjusted with the measuring/adjusting means of the treatment air flow rate sensor 104, the regeneration air flow rate sensor 123, the first-valve pressure sensor 107, the second-valve pressure sensor 112, the treatment air blower 103, the treatment air damper 105, the treatment air cooler 171, the regeneration air blower 122, the regeneration air damper 124 and the regeneration air cooler 125 and the switching controller 129.

Measurement signals are inputted to the switching controller 129, and control signals are outputted from it, as described in detail in Application Examples 1 and 2.

Further, the plate-shaped turnable valve bodies 134 of the first valve are in the n-position (see FIG. 7) and the plate-shaped turnable valve bodies 134 of the second valve are in the s-position (see FIG. 7), so that the pressure difference between the inflow port L1 and outflow port L3 of the first valve and the pressure difference between the inflow port L1 and outflow port L3 of the second valve are automatically adjusted with the movable plates 150b of the first valve and the movable plates 150c' of the second valve. Although not shown in FIG. 14, measurement signals of atmospheric pressure, a relative humidity, a temperature, etc., are also inputted to the switching controller 129.

(Function and Advantageous Effect)

In the apparatus having the automatic four-port selector valves of this invention, the flow rate and pressure of the treatment air and the flow rate and pressure of the regeneration air are adjusted as described above, the pressure difference between the inflow port L1 and outflow port L3 of the first valve and the pressure difference between the inflow port L1 and outflow port L3 of the second valve as described above, and the first valve 108 and the second valve 111 are simultaneously operated by means of the switching controller 129 for a short period of time to switch the treatment air from the first line to the second line and switch the regeneration air from the second line to the first line, so that the variation in the pressure of the supply air can be controlled so that it is within several % like Application Examples 1 and 2. Further, the variation in the temperature of the supply air can be controlled within ±1° C. Further, the clean humidity-controlled/temperature-controlled air supply apparatus 190 shown in FIG. 14 is free of stagnant places, so that the variation in the concentration of molecular contaminants is also within an tolerant accuracy.

(Found Measurement Data)

Figure 15:
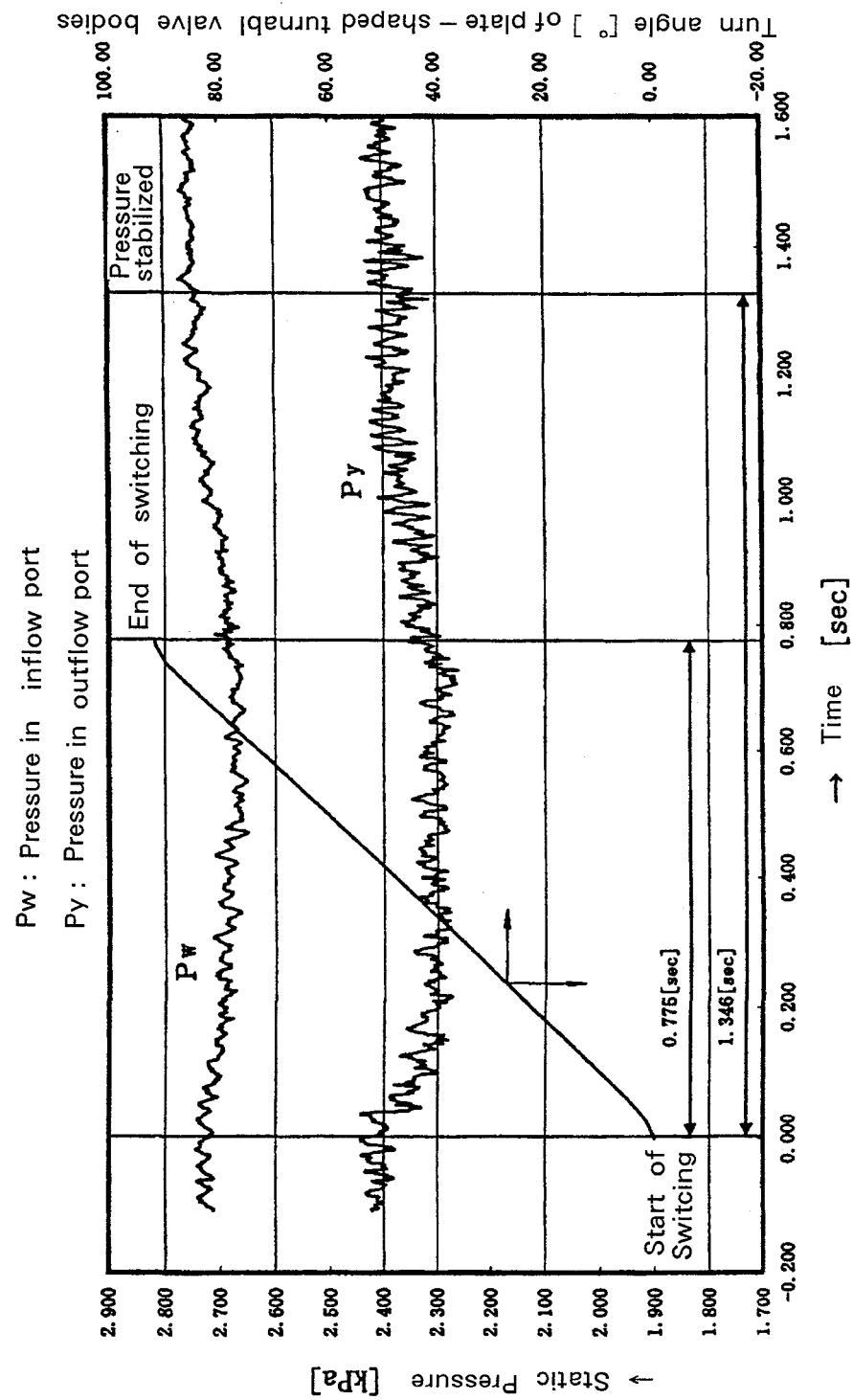
FIG. 15 is a graph showing the state of pressure variations in adsorption/regeneration switching in a clean temperature-controlled/humidity-controlled air supply apparatus provided with two automatic four-port selector valves of this invention.

FIG. 15 is a graph of actual data in the clean humidity-controlled/temperature-controlled air supply apparatus shown in FIG. 14, which shows the state of pressure variations that were measured and recorded during a time period from the start of the switching of adsorption/regeneration modes to the end of the switching with pressure sensors that had high-speed sampling functions and that were attached to the inflow port L1 and outflow port L3 of the second valve.

In the above Figure, Pw represents static pressures in L1 of the second valve and Py represents static pressures in L3 of the second valve. As is clearly shown in this graph, even when the switching is carried out for a switching time period of 0.775 second at a turn angle of 92° in the valves of this invention, the variation in the static pressure of the regeneration air (static pressure of supply air) can be controlled so that it is as small as within 5% and the variation in pressure difference: Pw–Py can be controlled also within 5%.

Furthermore, the flow rates were measured and adjusted before the switching and the flow variation is hence within tolerant accuracy. That the pressure difference: Pw–Py is nearly constant for a time period of the switching as above shows that the flow rates are maintained at constant levels.

When data in FIG. 15 is closely studied, it can be concluded to be a remarkable technological idea in which when the above method of switching adsorption/regeneration modes is applied to lines such as a clean humidity-controlled/temperature-controlled air supply apparatus provided with a combination of two automatic four-port selector valves of this invention based on the batch type temperature swing adsorption, all of the flow rate variation, pressure variation and pressure difference variation in the switching, which have been considered to be extremely difficult problems to solve in the practical use of various lines based on the batch type temperature swing adsorption, can be suppressed within tolerant accuracies.

In addition, the present invention is suitably applied to a method of supplying a clean electronic-part manufacturing plant or clean semiconductor manufacturing plant or facilities having a constitution including at least one of a clean room, a clean booth, a clean bench, apparatuses for manufacturing an electronic parts, including a semiconductor manufacturing apparatus, a liquid crystal display manufacturing apparatus, an organic EL display manufacturing apparatus, a clean tunnel, a clean oven, a storage warehouse for the protection of process substrates, a stocker, a transfer unit as an accessory to a manufacturing apparatus, a loader/unloader, an enclosure, an inspection apparatus and an auxiliary machine, with clean air, dry air, clean temperature-controlled/humidity-controlled air, a cleaning nitrogen gas, a dry nitrogen gas or a clean temperature-controlled/humidity-controlled nitrogen gas.

Further, the present invention is suitably applied to a clean electronic-part manufacturing plant or clean semiconductor manufacturing plant or facilities having a constitution including at least one of a clean room, a clean booth, a clean bench, apparatuses for manufacturing an electronic parts, including a semiconductor manufacturing apparatus, a liquid crystal display manufacturing apparatus, an organic EL display manufacturing apparatus, a clean tunnel, a clean oven, a storage warehouse for the protection of process substrates, a stocker, a transfer unit as an accessory to a manufacturing apparatus, a loader/unloader, an enclosure, an inspection apparatus and an auxiliary machine, the clean electronic-part manufacturing plant or clean semiconductor manufacturing plant or facilities having at least one of an air cleaning apparatus, a dry air supply apparatus, a clean temperature-controlled/humidity-controlled air supply apparatus, a cleaning nitrogen gas supply apparatus, a dry nitrogen gas supply apparatus and a clean temperature-controlled/humidity-controlled nitrogen gas supply apparatus.

INDUSTRIAL APPLICABILITY

According to the automatic four-port selector valve of this invention, a batch type temperature swing adsorption (TSA) line having equivalent two adsorbent units can be constituted using two valves that are the above automatic four-port selector valves.

In the automatic four-port selector valve of this invention, the top plate, bottom plate, and side plate, constituting the casing body, framed partition plates, rotation shaft and plate-shaped turnable valve bodies thereof can be provided with heat-insulating functions, so that the transfer of heat from a high-temperature gas to a low-temperature gas is inhibited even when a regeneration gas having a high temperature flows adjacently to a treatment gas or supply air having a low temperature in the above valve, and hence the removal by adsorption and the regeneration by desorption can be simultaneously performed without being influenced.

In addition thereto, the flow rates, pressures (static pressure) and pressure differences of the treatment gas and the regeneration gas are controlled by output signals from the switching controller so that they come to be equal flow rates, equal static pressures and equal pressure differences prior to the switching of the adsorption/regeneration modes, and further the actuation motors for the two switching valves operate to ensure that they start simultaneously, stop simultaneously and operate for a short period of time of 0.1 to 20 seconds, so that the variations in the flow rates, static pressures and pressure differences are within tolerant accuracies.

When the automatic four-port selector valve of this invention is used, there can be provided an apparatus based on the batch type temperature swing adsorption in which the following air or gas is supplied after the flow rates, static pressures and pressure differences are controlled to be within tolerant accuracies in the switching, with regard to a cleaning apparatus for supplying air or nitrogen gas whose molecular contaminants are removed to the level of ppb to a clean room, a clean chamber or a mini-environment, an apparatus for supplying a temperature-controlled/humidity-controlled air or temperature-controlled/humidity controlled gas whose molecular contaminants are removed and an apparatus for supplying dry air or dry nitrogen gas whose water content is removed to a dew point of −80° C. or lower.

As described above, the automatic four-port selector valve of this invention has remarkably great industrial utility.

The invention claimed is:

1. An automatic four-port selector valve comprising:
a casing having an internal space portion;
framed partition plates for separating said space portion into first, second, third, and fourth rooms, each framed partition plate having an opening portion;
plate-shaped turnable valve bodies for opening or closing the opening portions of said framed partition plates;
an inflow port for always letting a gas flow in through it in any instance, a first inflow/outflow port for letting a gas flow in and flow out through it alternately, an outflow port for always letting a gas flow out through it in any instance, and a second inflow/outflow port for letting a gas flow in and flow out through it alternately with said first inflow/outflow port, the ports being provided in said separated four rooms; and
a driving means for turning said plate-shaped turnable valve bodies about a rotation shaft,
wherein said opening portions include means for independently changing opening ratios (%) thereof, and the opening ratio changing means are movable vertically or horizontally along an inner wall surface of said first or third rooms when said plate-shaped turnable valve bodies are arranged or positioned in said second or fourth rooms or along an inner wall surface of second and/or fourth room when said plate-shaped turnable valve bodies are arranged or positioned in said first or third rooms, and said means are thereby capable of changing the opening ratios (%) of said opening portions.

2. The automatic four-port selector valve of claim 1, wherein said means for changing opening ratios are constituted of movable plates and actuators and said movable plates synchronize with turning of said plate-shaped turnable valve bodies in operation.

3. An automatic four-port selector valve comprising:
a casing having an internal space portion;
framed partition plates for separating said space portion into first, second, third, and fourth rooms, each framed partition plate having an opening portion;
plate-shaped turnable valve bodies for opening or closing the opening portions of said framed partition plates;
an inflow port for always letting a gas flow in through it in any instance, a first inflow/outflow port for letting a gas flow in and flow out through it alternately, an outflow port for always letting a gas flow out through it in any instance, and a second inflow/outflow port for letting a gas flow in and flow out through it alternately with said first inflow/outflow port, the ports being provided in said separated four rooms; and
a driving means for turning said plate-shaped turnable valve bodies about a rotation shaft,
wherein at least one of said inflow port or said outflow port includes a pressure sensor.

4. A batch type temperature swing adsorption apparatus having two lines of adsorbent units, wherein the two lines of adsorbent units include two automatic four-port selector valves, as a first valve and a second valve in combination, said valve comprising:
a casing having an internal space portion;
framed partition plates for separating said space portion into first, second, third, and fourth rooms, each framed partition plate having an opening portion;
plate-shaped turnable valve bodies for opening or closing the opening portions of said framed partition plates;
an inflow port for always letting a gas flow in through it in any instance, a first inflow/outflow port for letting a gas flow in and flow out through it alternately, an outflow port for always letting a gas flow out through it in any instance, and a second inflow/outflow port for letting a gas flow in and flow out through it alternately with said first inflow/outflow port, the ports being provided in said separated four rooms; and
a driving means for turning said plate-shaped turnable valve bodies about a rotation shaft,
and each of the two lines of adsorbent units includes regeneration means for regenerating adsorption capability of said adsorbent unit, measuring/adjusting means each for a static pressure of treatment gas, a static pressure of supply gas, a static pressure of regeneration gas, and a static pressure of exhaust gas, measuring/adjusting means for a flow rate of the regeneration gas and/or a flow rate of the treatment gas, and a switching controller for controlling the switching of adsorption operation and regeneration operation with said first valve and said second valve.

5. The batch type temperature swing adsorption apparatus of claim 4, wherein each of said adsorbent units comprises units that are formed of an adsorbent for adsorbing molecular contaminants or an adsorbent for adsorbing water, said units being arranged in series.

6. The batch type temperature swing adsorption apparatus of claim 4, wherein measurement signals from pressure sensors of said first valve and said second valve are input to said switching controller.

7. The batch type temperature swing adsorption apparatus of claim 4, wherein said regeneration means has a regenerating blower capable of adjusting a flow rate of the regeneration gas in the range that is 0.05 to 1.2 times the flow rate of the treatment gas.

8. The batch type temperature swing adsorption apparatus of claim 4, wherein that the flow rate of the treatment gas and the flow rate of the regeneration gas are adjusted to ensure that they come to be equal to each other, and further the static pressure of the treatment gas and the static pressure of the regeneration gas are adjusted to ensure that they come to be equal to each other, before the switching of the adsorption/regeneration modes, and then the switching of adsorption/regeneration modes are made.

9. The batch type temperature swing adsorption apparatus of claim 4, wherein a pressure difference of the flow of the treatment gas flowing in a flow passage from the first valve inflow port to the second valve outflow port, and a pressure difference of the flow of the regeneration gas flowing from the inflow port of the second valve to the outflow port of the first valve are adjusted before said switching of the adsorption/regeneration modes to ensure that they come to be equal to each other.

10. The batch type temperature swing adsorption apparatus of claim 4, which is an air cleaning apparatus, a dry air supply apparatus, a clean temperature-controlled/humidity-controlled air supply apparatus, a cleaning nitrogen gas supply apparatus, a dry nitrogen gas supply apparatus, or a clean temperature-controlled/humidity-controlled nitrogen gas supply apparatus.

11. A method of supplying a clean electronic-parts manufacturing plant or clean semiconductor device manufacturing plant or facilities having a constitution including at least one of a clean room, a clean booth, a clean bench, apparatuses for manufacturing electronic parts, including a semiconductor device manufacturing apparatus, a liquid crystal display manufacturing apparatus, an organic EL display manufacturing apparatus, a clean tunnel, a clean oven, a storage warehouse for protection of process substrates, a stocker, a transfer unit as an accessory to a manufacturing apparatus, a loader/unloader, an enclosure, an inspection apparatus and an auxiliary machine, with clean air, dry air, clean temperature-controlled/humidity-controlled air, a cleaning nitrogen gas, a dry nitrogen gas, or a clean temperature-controlled/humidity-controlled nitrogen gas by the apparatuses recited in claim 10.

12. A clean electronic-part manufacturing plant or clean semiconductor device manufacturing plant or facilities having a constitution including at least one of a clean room, a clean booth, a clean bench, apparatuses for manufacturing electronic parts, including a semiconductor device manufacturing apparatus, a liquid crystal display manufacturing apparatus, an organic EL display manufacturing apparatus, a clean tunnel, a clean oven, a storage warehouse for protection of process substrates, a stocker, a transfer unit as an accessory to a manufacturing apparatus, a loader/unloader, an enclosure, an inspection apparatus and an auxiliary machine, the clean electronic-parts manufacturing plant or clean semiconductor device manufacturing plant or facilities having at least one of the air cleaning apparatus, the dry air supply apparatus, the clean temperature-controlled/humidity-controlled air supply apparatus, the cleaning nitrogen gas supply apparatus, the dry nitrogen gas supply apparatus and the clean temperature-controlled/humidity-controlled nitrogen gas supply apparatus recited in claim 10.

* * * * *